May 22, 1951 A. G. BODINE, JR 2,554,005

EARTH BORING APPARATUS

Filed Dec. 11, 1950 10 Sheets-Sheet 1

ALBERT G. BODINE JR.
INVENTOR.

BY Forrest J. Lilly

ATTORNEY.

May 22, 1951 A. G. BODINE, JR 2,554,005

EARTH BORING APPARATUS

Filed Dec. 11, 1950 10 Sheets-Sheet 2

ALBERT G. BODINE JR.
INVENTOR.

BY Forrest J. Lilly
ATTORNEY.

EARTH BORING APPARATUS

Filed Dec. 11, 1950 10 Sheets-Sheet 3

INVENTOR.
ALBERT G. BODINE JR.
BY [signature]
ATTORNEY.

ALBERT G. BODINE JR.
INVENTOR.

BY Fraud J. Filley

ATTORNEY.

May 22, 1951 A. G. BODINE, JR 2,554,005

EARTH BORING APPARATUS

Filed Dec. 11, 1950 10 Sheets-Sheet 5

ALBERT G. BODINE JR.
INVENTOR.

BY [signature]

ATTORNEY.

ALBERT G. BODINE JR.
INVENTOR.

BY [signature]

ATTORNEY.

INVENTOR.
ALBERT G BODINE JR.
BY Forrest J. Lilly
ATTORNEY.

May 22, 1951 A. G. BODINE, JR 2,554,005

EARTH BORING APPARATUS

Filed Dec. 11, 1950 10 Sheets-Sheet 8

ALBERT G. BODINE JR.
INVENTOR.

BY Forrest J. Lilly

ATTORNEY.

May 22, 1951 A. G. BODINE, JR 2,554,005

EARTH BORING APPARATUS

Filed Dec. 11, 1950 10 Sheets-Sheet 9

ALBERT G. BODINE JR.
INVENTOR.

BY Ernest J. Lilly

ATTORNEY.

ALBERT G. BODINE JR.
INVENTOR.

BY [signature]

ATTORNEY.

Patented May 22, 1951 2,554,005

UNITED STATES PATENT OFFICE 2,554,005

EARTH BORING APPARATUS

Albert G. Bodine, Jr., Van Nuys, Calif., assignor to Soundrill Corporation, Los Angeles, Calif., a corporation of California Application December 11, 1950, Serial No. 200,277

16 Claims. (Cl. 255—4)

This invention relates generally to earth boring, particularly, though not limited, to boring through especially hard rock formations, and it deals especially with drilling apparatus which longitudinally vibrates the drill bit while the latter is being applied to the formation. The present application is a continuation-in-part of my copending application entitled Earth Boring Tool, filed September 16, 1946, Serial No. 697,235, now abandoned.

The general object of the invention is the provision of a novel and more powerful form of earth boring apparatus than has heretofore been known in the art, employing a bit which is vibrated longitudinally against the formation.

While all of the factors are not yet known or fully evaluated, my drilling apparatus bores through hard and dense earthen formation, such as granite, by apparently causing the formation to undergo an elastic vibration, which results in failure of the formation under the bit by elastic vibration fatigue. In recent experiments, boring in granite earthen formation, the drilling rate has been in the neighborhood of 6 inches per minute, as against one inch per minute for the most modern rotary rock drilling apparatus. This performance I accomplish by proceeding with apparatus designed to radiate sound waves (elastic waves of tension and compression) from the bit into the formation, the bit being acoustically coupled to the formation by being held forcibly against it, and being at the same time vibrated longitudinally to transmit the waves to and into the formation. Earthen formation can apparently be thus set into a substantial degree of elastic vibration; and since rock cannot withstand substantial tensile stresses or stress reversals, rapid fatigue and fracture of the formation under the bit is accomplished. The drill of the invention also drills at high speed through the softer formations, though whether the same vibration fatigue failure is likely to occur in such case is still open to speculation.

It is apparently not possible, however, to elastically vibrate earthen formation at very high amplitude, the maximum obtainable deformation stroke or displacement range evidently being not over ⅜ to ½ inch. Also, earthen formation is dynamically quite stiff, i. e., it requires a cyclic force of very high amplitude to vibrate it even through a relatively low displacement range. In terms of acoustics, the formation may be said to have high acoustic impedance, by which term is understood the ratio of the cyclic force exerted to the resulting displacement velocity. Velocity amplitude is of course low when displacement amplitude is low. I have found that the bit should have movement and force characteristics correlated to these vibration characteristics of the formation. Specifically, I have found that the bit should have vibratory motion of low amplitude (compatible with the low amplitude movement of the formation), with high cyclic force exertion against the formation.

One important object of the invention accordingly becomes the provision of means for longitudinally vibrating the bit with an action characterized by high cyclic force but low amplitude (or velocity) of stroke.

A more specific object is the provision of a powerful vibratory drilling apparatus operatively connected with the bit and lowered with the bit into the bore hole, which apparatus sends to the bit the requisite high amplitude cyclic force impulses while driving the bit through the requisite low amplitude stroke.

According to the invention, the elastic vibration generator is an assembly or combination of motor means and mechanical vibrator, the mechanical vibrator being driven by the motor means, and being, in turn, drivingly coupled to the bit. The vibrator is of a type characterized by use of a mechanically moving mechanism, and the motor means which drives said mechanism may be of any type, electric, hydraulic, or otherwise, conforming to certain requirements to be presently explained. First of all, the motor means must of course be of sufficiently compact lateral dimensions to go into the bore hole, and the only way a motor can be so restricted in dimensions and still develop the necessary power to drive the bit is to employ a motor characterized by a high displacement rate. As an example, a hydraulic motor suited to the problem should be one handling many gallons per minute; and an electric motor or solenoid should be characterized by a large product of armature velocity and armature area. A simple commercially available motor of relatively high speed and relatively low force or torque meets this requirement. Unfortunately, however, while such a high speed, low force or low torque motor is compatible with the requirement that the motor be kept small enough to enter the bore hole, such a motor is not suited for direct drive of the bit, which has been shown to require power of precisely the opposite form, namely, a high ratio of force to velocity.

A further object of the invention is accordingly the provision of an elastic wave generator whose motor means has high displacement rate, for example, a high speed, low torque rotary motor, but which generator will nevertheless supply the essential need of the bit and the stiff formation for a high alternating force acting through a vibration cycle of small amplitude.

The invention accordingly incorporates, as an integral feature of the vibration generator assembly or combination, and in connection with the motor means thereof, or between said motor means and the point of vibratory power delivery, an impedance adjustment characteristic, the present exemplification of which comprises a velocity reducing mechanical transformer, for establishing an effective coupling between large displacement rate in the motor (low impedance), and small effective linear velocity at the vibratory bit (high impedance). In fact, the success of my drill has been found to depend on the provision of this impedance adjustment for adjusting and coupling the very active motor means to the relatively sluggish or stolid formation, permitting an effective drive of the latter by the former.

Maximum power delivery from the system depends, at least in part, upon establishment of substantially a fixed value for the product of force and velocity at all points of the system from the power source to the load, even though the quotient of force and velocity be varied. This feature is especially evident within the generator assembly in the velocity reducing coupling of the high displacement rate motor to the vibratory power output, wherein a substantially constant product of force and velocity is preserved throughout. It should be evident that this velocity reducing means is likewise a force gaining device for a high displacement rate motor. The velocity reducing transformer can take various forms, as noted hereinafter, including reactive force build-up (with consequent velocity reduction) in fast moving or heavy constrained mass vibrators, multi-stage motors, and leverage devices such as gear trains or cams. In all cases we find a high displacement rate motor, force gain and velocity reduction, and a substantially constant product of force and velocity.

Inasmuch as the vibration generator assembly delivers a longitudinal vibration for actuation of the bit, it necessarily follows that at least a portion of the generator assembly, including some of its necessary attachment structure, must partake of a longitudinal vibratory motion similar to that of the bit. The inertia of this vibratory structure, as well as of that of the bit, is a deterrent to the desired vibratory motion, a reciprocating inertia member in and of itself being inherently a waster of force. In addition, as already intimated, the bit evidently operates in many cases by vibrating a portion of the formation itself. To reduce the force wastage caused by these inertia factors, and to convert the inertias involved from a liability into an advantage, I convert the system into a resonant acoustic circuit by coupling into it a longitudinally vibratory elastic rod having such mass and stiffness parameters as will "tune out" the described inertia factors. The vibration generator is driven with a frequency such as will resonate this rod and the inertia members to which it is coupled, and the force wastage mentioned above is thereby corrected. In addition, this vibratory rod introduces into the system an important and highly advantageous fly-wheel type of momentum.

In a typical arrangement, the vibration generator is coupled to the upper end of this elastic rod, and the bit is coupled to the lower end thereof, while a drill string, either pipe or wire line, is employed to lower the assembly in the bore hole. Other arrangements are equally feasible, and as one example I may mention the location of the generator between the lower end of the elastic rod and the bit. This elastic rod is a very long and massive member, and may typically consist of several steel drill collars coupled end to end, so as to make up a rod length of say 120 feet. Preferably the drill collars will have a cross-sectional area at least as great as, or greater than, that of a solid rod of one-half the diameter of the bore hole.

In operation, vibration forces generated by the elastic vibration generator are applied in a longitudinal direction to this elastically vibratory rod, and set up in the rod successive waves of tension and compression traveling in the rod with the speed of sound. The frequency of the vibration generator is adjusted to fall within the range of resonance of the rod for longitudinal elastic vibration. Resonance, as used in this specification and the appended claims, denotes, not a precise frequency, but a frequency range wherein longitudinal elastic vibration is substantially amplified by virtue of a complete or partial mutual cancellation of stiffness and inertia reactances at the frequency at which the generator is operated. Under these conditions, the elastic rod exhibits a longitudinal standing wave pattern, having one or more regions along its length where substantial longitudinal vibration can be observed, and one or more other regions where vibratory motion is either zero, or very small. In the described resonance range, the elastic stiffness of the rod "tunes out" the inertia of its own vibratory mass, the mass of the associated bodies such as the vibration generator housing and the bit, and the mass of any "coupled-in" portion of the formation that may vibrate with the bit, so that wastage of force by all vibrating inertia bodies or members is minimized, and maximum vibration amplitude is thereby achieved.

The feature of velocity reduction and correlative force gain between high displacement rate, i. e., low impedance, at the motor means and the point of power delivery from the vibrator to the elastically vibratory rod has already been mentioned. This is of particular importance and significance in my drilling system, which, with its resonant vibratory rod, is actually a resonant acoustic circuit. It can be analysed acoustically by considering that the earthen formation represents a high impedance load, and the power available within the motor is in a low impedance form (high displacement rate). The invention then provides an impedance adjustor to provide an effective or necessary degree of impedance matching between the low impedance motor and the high impedance load, so as to achieve reasonable power delivery from the motor into the load. The velocity reducing mechanical transformer is accordingly an impedance adjusting device through which the small motor of high displacement rate is enabled to drive the bit engaged against the formation with high cyclic force through a very small vibration amplitude.

The feature of force gain between the motor and the vibratory rod not only serves as an impedance adjustment, however, but also provides sufficient force to assure the vibratory drive of the massive vibratory rod under the adverse conditions encountered in well drilling. With the bit resting on the hole bottom, the approximately 120 foot length of drill collars making up the vibratory rod bear frictionally against the sides of the well bore, and the sides of the rod being bathed in drill fluid, a very high force exertion is necessary to drive the vibratory rod, particularly at starting. The feature of velocity reduction and force gain assures effective vibratory drive of the rod notwithstanding these adverse conditions.

The combination of the impedance adjustor with the elastically vibratory rod, the former being employed between a high displacement rate feature at the motor and the driving connection of the motor driven vibrator to the rod, is the key to my broad invention. My drill embodying this combination, with the impedance adjustment attained by a force gain at the expense of velocity, has yielded a totally new and unexpected result in drilling rate—something of the order of six times that obtainable with conventional equipment, based on recent tests in unweathered California granite. The resonant vibratory rod not only amplifies the vibratory action, but exerts a strong monitoring influence with its energy storing ability permitting the vibration generator to operate with high vibration rate and amplitude even when the bit is momentarily highly loaded, or even stalled. The velocity reduction and force gaining feature permits vibratory action of this rod and of the bit with sufficient cyclic force and power to yield what is evidently a unique type of drilling action, viz., rapid failure of the formation under the bit in large fragments by vibration fatigue. In this connection, the elastic stiffness of the rod permits better "coupling-in" of any portion of the earthen structure that tends to vibrate with the bit, so becoming a part of the acoustic circuit. Since the high displacement rate motor couples in the "low impedance" motive power source from above and the rod couples in the "high impedance" vibrating earthen structure from below, these features, together with the velocity reducer, make available a complete, impedance-adjusted, resonant acoustic circuit, with the fatigue action on the formation intimately driven at maximized power by the momentum of the power source. The striking performance of my drilling system is due in large measure to the combined use of the two coupling links consisting of the high displacement rate motor and the resonant rod.

If the combination consisting of the vibration generator, with its included velocity reducer, the bit, and the resonant rod are connected up and operated at the ground surface, some very characteristic performances may be observed.

In the resonant range of frequency, a greatly amplified longitudinal elastic motion of the apparatus is apparent. There are longitudinally spaced regions along the rod reciprocating to a maximum extent and there is at least one intervening region which does not substantially reciprocate, but rather experiences large cyclic stresses. There is no bodily movement of the rod as a whole. This distribution of maxima and minima is a standing wave pattern which corresponds, for the simple case of fundamental frequency operation, to the speed of compressional waves in the rod and to the frequency of the elastic vibration substantially according to the equation $f=S/2L$, where $f$ is the fundamental frequency of vibration, S is the speed of compressional waves in the rod, and L is the length of the rod. As already stated, a feature of great interest and importance is the fact that there is a substantial velocity reduction between the motor and the point where the vibrator connects to the resonant rod. For example, assuming a turbine type of motor, designed to be driven by the mud flow through the apparatus, the linear velocity at the rotor blades, driven by the high velocity mud stream, can be seen to be greater than the effective linear velocity at the driving connection between the vibrator rod and the elastic rod. This velocity reduction furnishes the impedance adjustment that permits the high displacement rate motor to drive the high impedance load.

For optimum power delivery the generator with its incorporated velocity reducing transformer is connected to the elastically vibratory rod near a region of maximum vibration amplitude of the rod. The most convenient coupling point is usually the upper end of the rod, which in the case of the usual simple form of rod is a region of substantial vibration. The bit is coupled to the lower end of the rod, which is always a region of substantial vibration, and the bit is accordingly subjected to the vibratory action found at the lower end of the rod. In this arrangement, the resonant rod serves several purposes and functions, as follows: (*a*) to tune out the masses of such heavy vibrating members as the vibration generator housing and the bit, and sometimes a portion of the formation, and thereby reduce the serious wastage of force otherwise caused in vibrating these bodies, (*b*) to couple the vibration generator to the bit and to serve as an energy conduit therebetween, and (*c*) to serve as an energy storage device, i. e., to add "fly-wheel effect," or "Q," to the system. It will be seen that only the first and third of these functions are basically essential, as the second is absent when the vibration generator is intercoupled between the lower end of the rod and the bit.

If this equipment, with its described easily observable resonant operating characteristics at the ground surface, is lowered into a well, and driven in the same general frequency range, with the bit bearing firmly against the formation, it will drill at an extremely rapid rate, presumably with the same resonant standing wave behavior occuring in the bottom of the well. Hard formation, such as granite, gives way with remarkable speed, and bailing operations reveal that the rock breaks up under the bit in large fragments, often up to sizes nearly equal to a man's fist. The appearance of these fragments lends strong support to the theory that the formation is failing by elastic vibration fatigue, rather than due to cutting action by the bit.

A further important feature of the invention relates to acoustic decoupling of the apparatus from the drill fluid. With a vibratory drilling apparatus such as that disclosed herein, sound waves may be generated in the drill fluid and may represent a large subtraction from the energy supply to the bit action. The invention accordingly provides broadly for "decoupling" the vibratory apparatus from the drill fluid. This is accomplished in several ways, one of the simplest of which is acoustic isolation of at least a portion of the vibratory apparatus from the drill fluid, as for example by providing the elastic rod with a fluid excluding jacket, or by providing a gas trap bell around the bit or other portions of the apparatus. These provisions, in several forms to be described hereinafter, provide room for the cyclically displaced drill fluid, and thereby avoid and prevent cyclic pressure fluctuations in the fluid, with resulting dissipation of substantial vibratory energy. I have also found it an advantage to decouple the apparatus from any supporting structure such as the drill string, so as to prevent acoustic energy loss up said string. For example, I may employ for this purpose a marked change in cross-sectional area between the vibratory apparatus and the supporting drill string, or I may employ a flexible coupling device between the vibratory apparatus and the supporting drill string.

The invention will be more fully understood from the following detailed description of certain present illustrative embodiments thereof, reference being made to the accompanying drawings, in which:

Figure 1 is a view showing the drilling apparatus of the present invention suspending in a well bore;

Figure 1*a* is an elevational view showing the vibratory portion of the apparatus of Figure 1 to a somewhat larger scale;

Figures 1, 1A, 2:
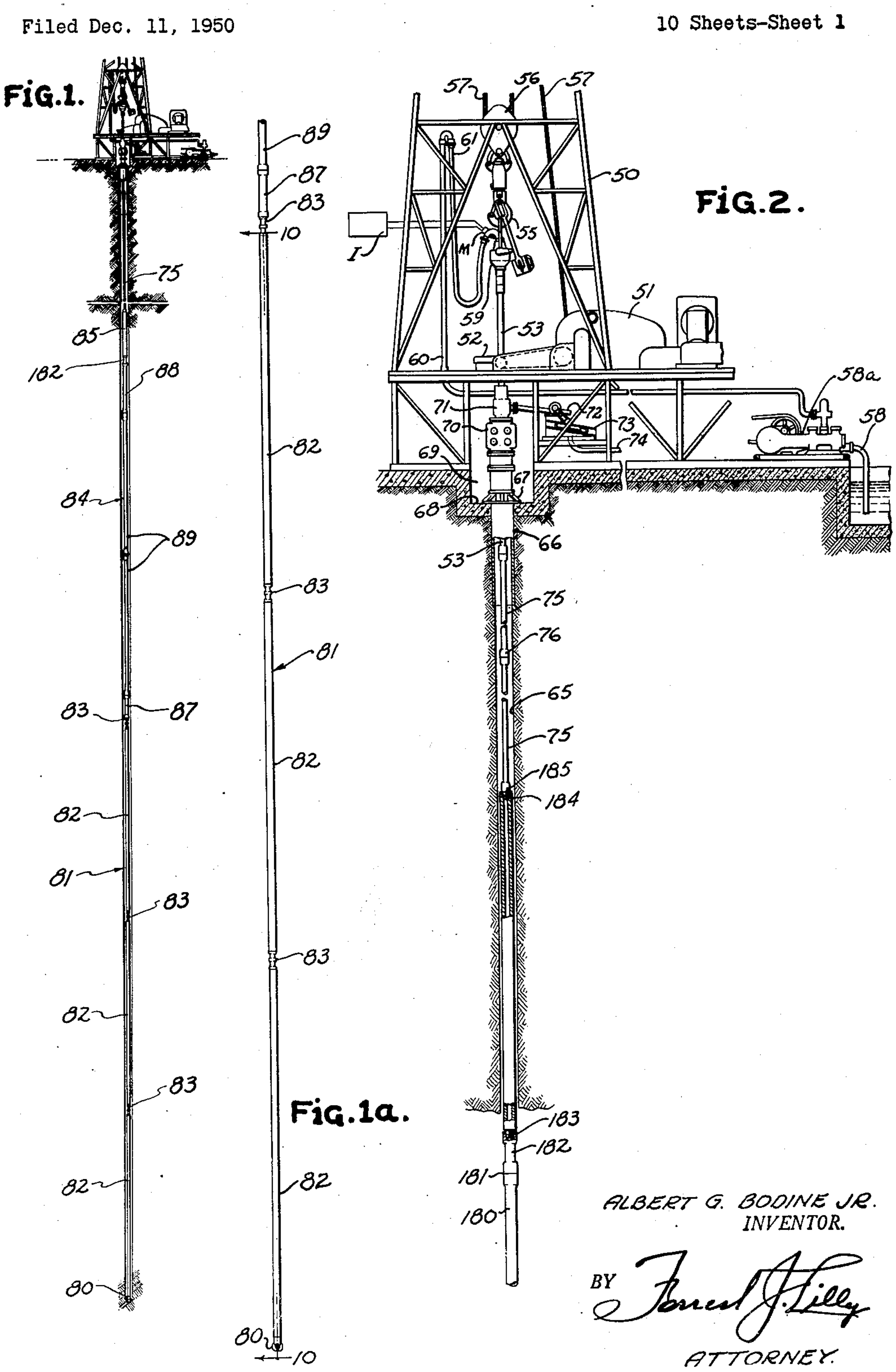
Figure 2 is a view, partly in elevation and partly in section, showing a typical installation of surface equipment and showing the drilling string down to and including an upper portion of the drilling assembly proper of the present invention.
Figures 6, 6A, 7, 8, 9, 10:
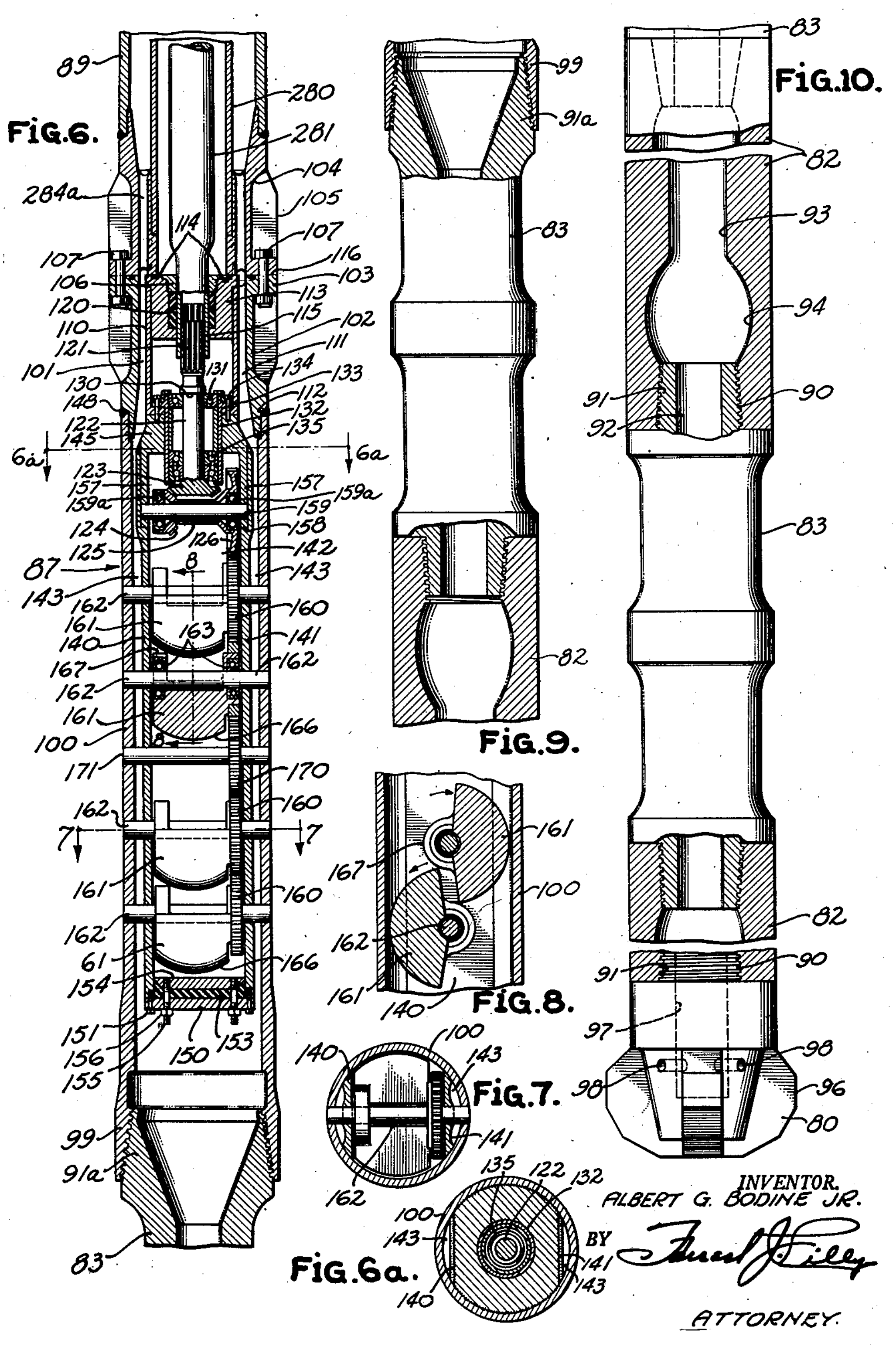
Figure 6 is a longitudinal sectional view of the vibrator unit at the lower end of the transmission shaft section.
Figure 11:
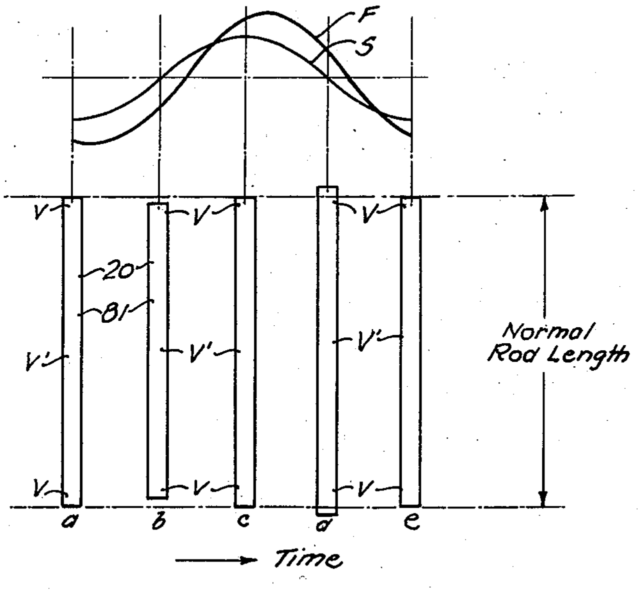
Figure 12:
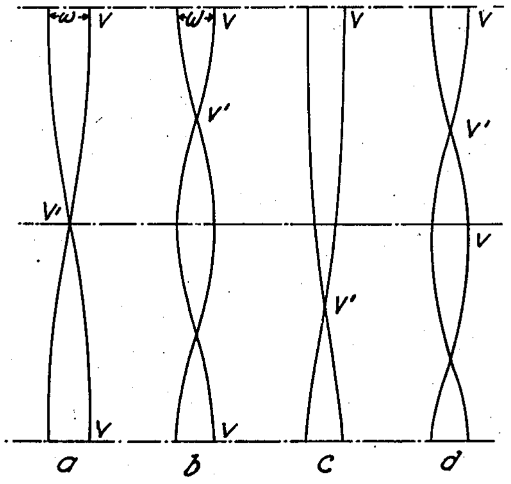
Figure 13:
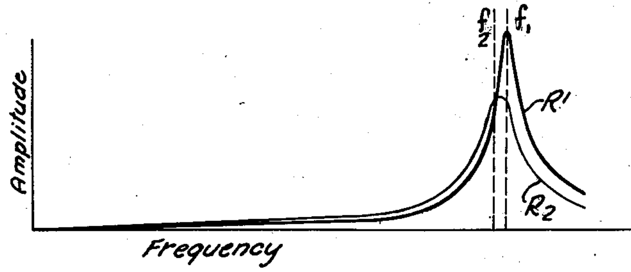
Figure 16:
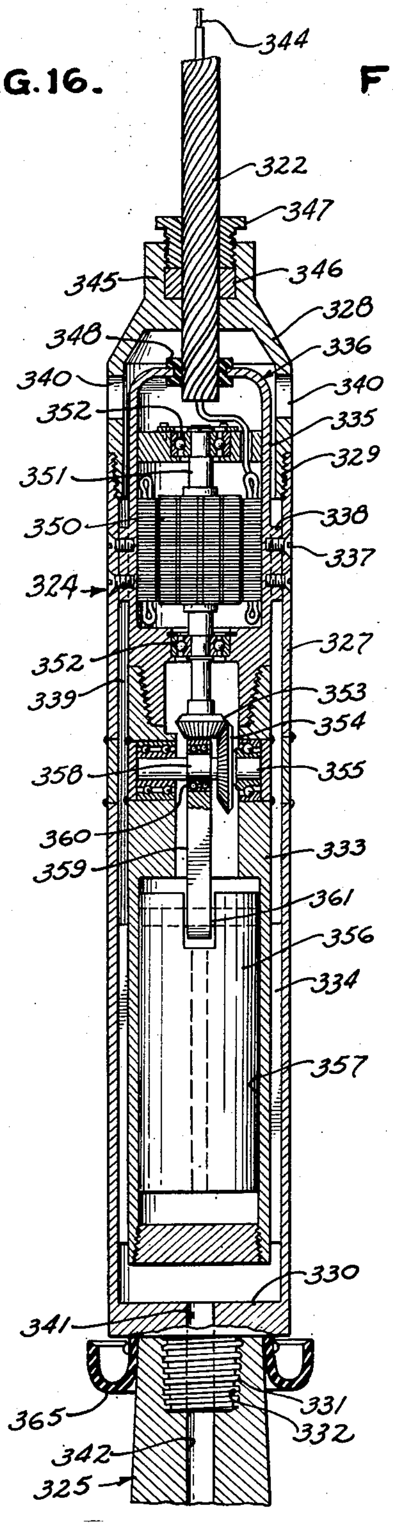
Figures 14, 17A:
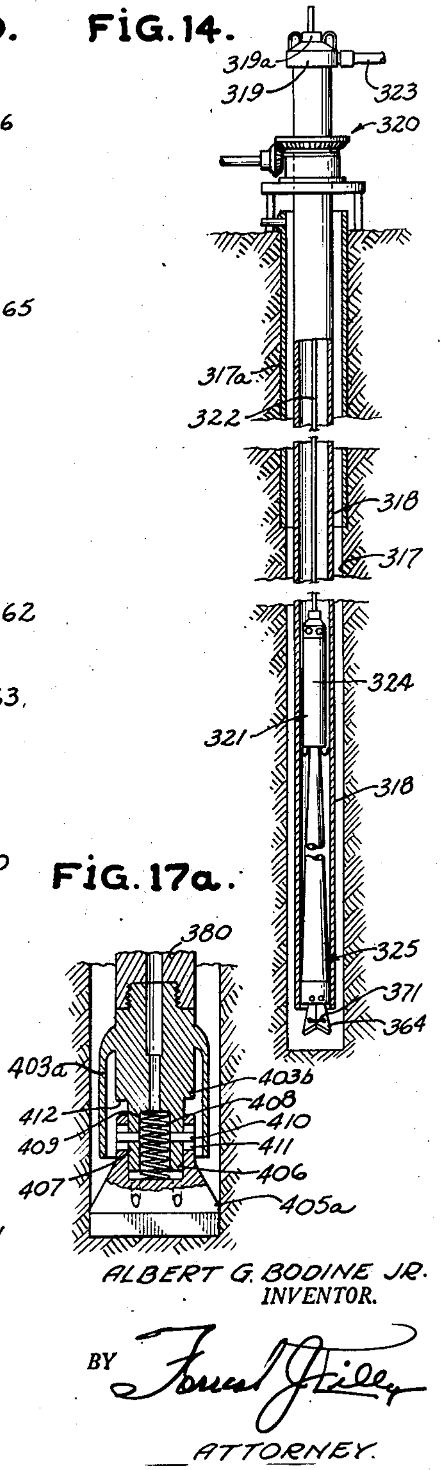
Figure 15:
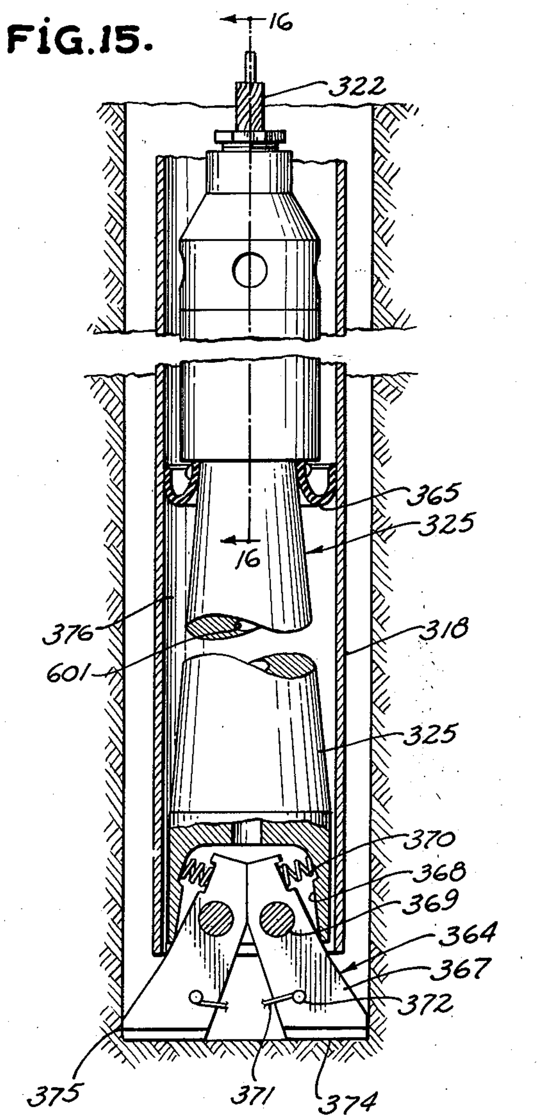
Figure 24:
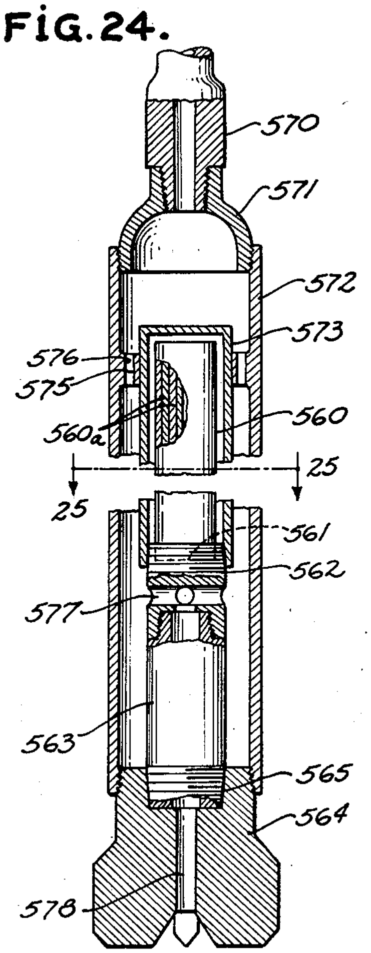
Figure 25:
Figures 17, 18, 23:
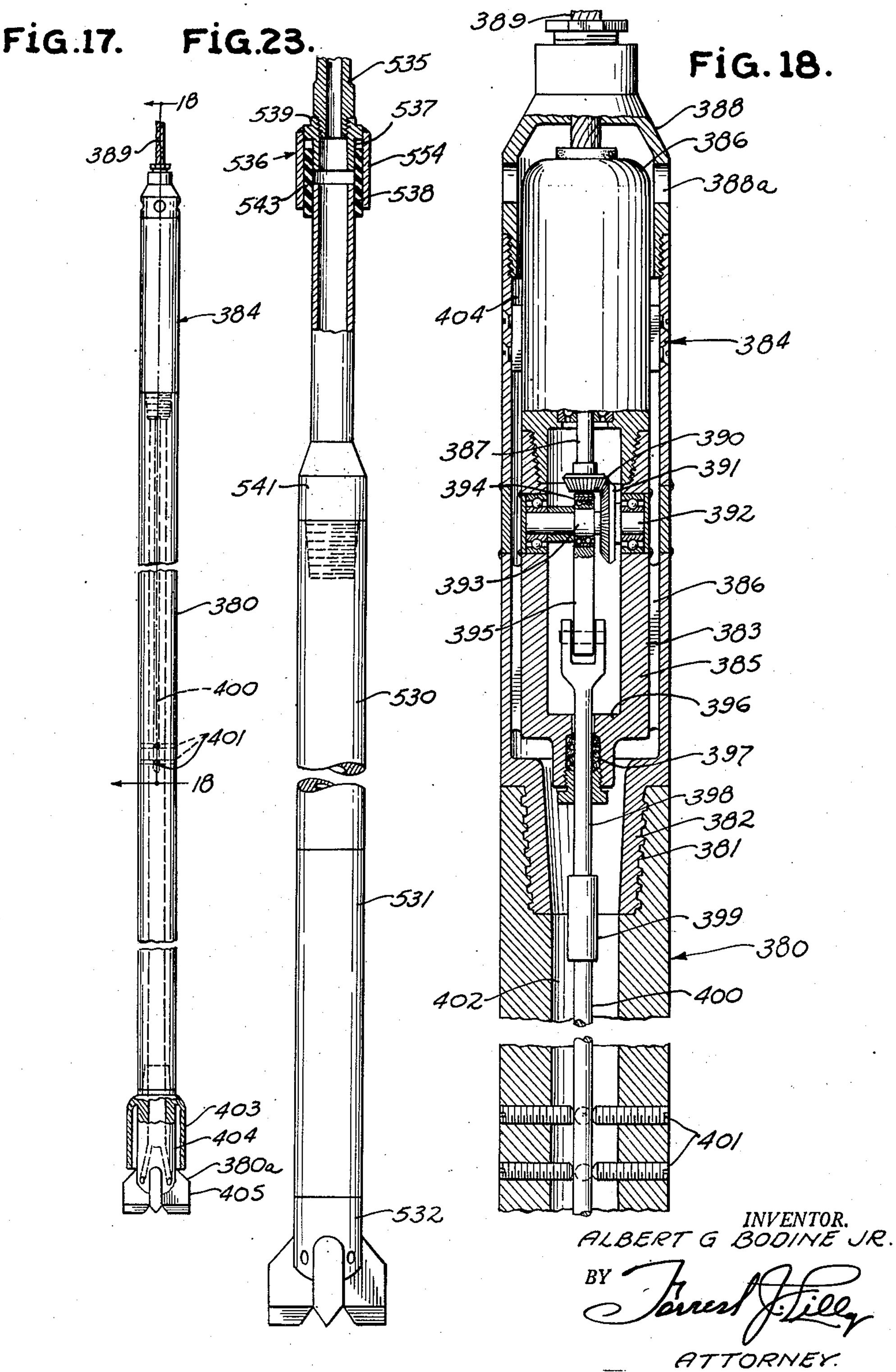
Figures 19, 19A:
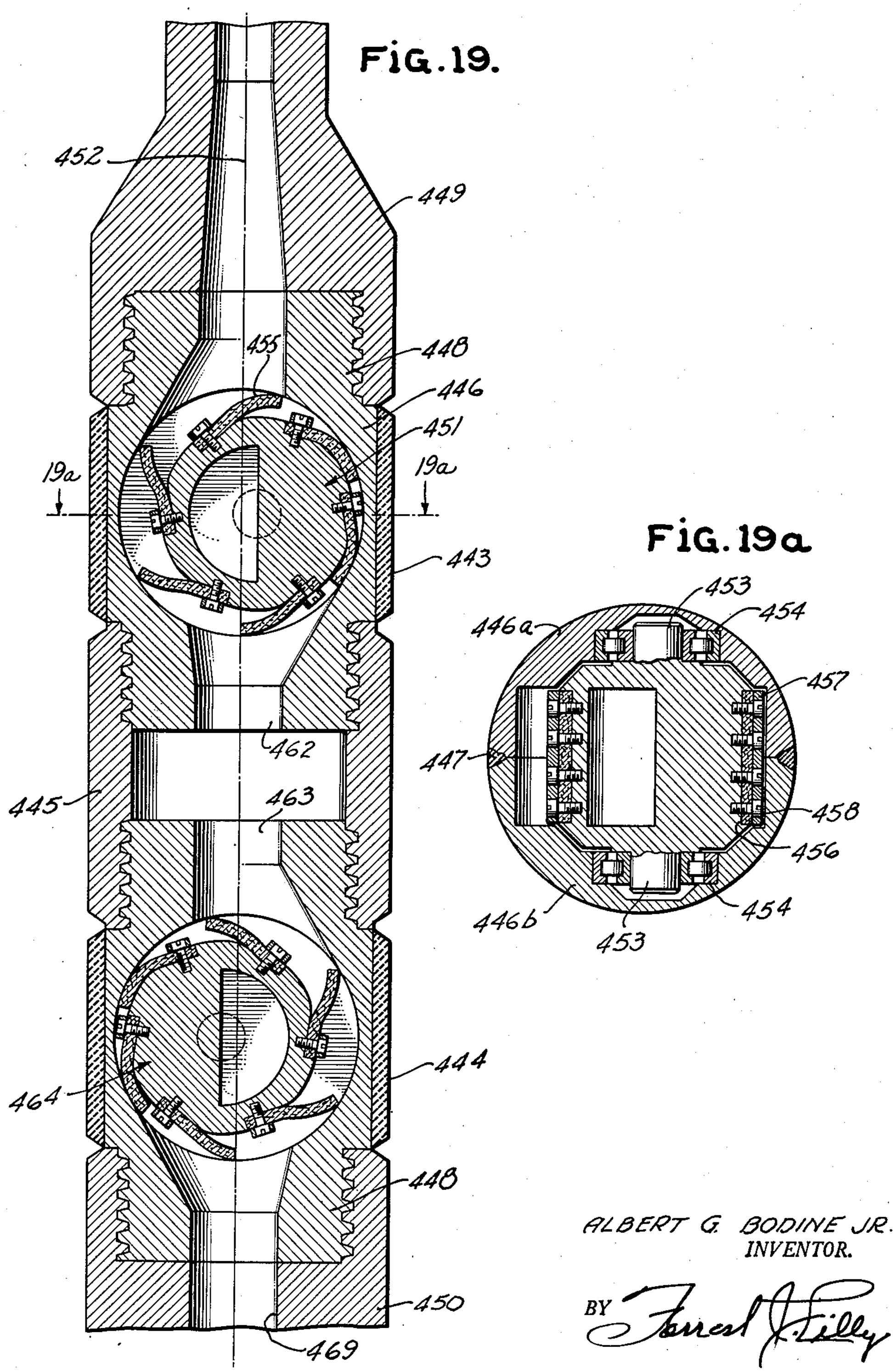
Figures 20, 21, 22:
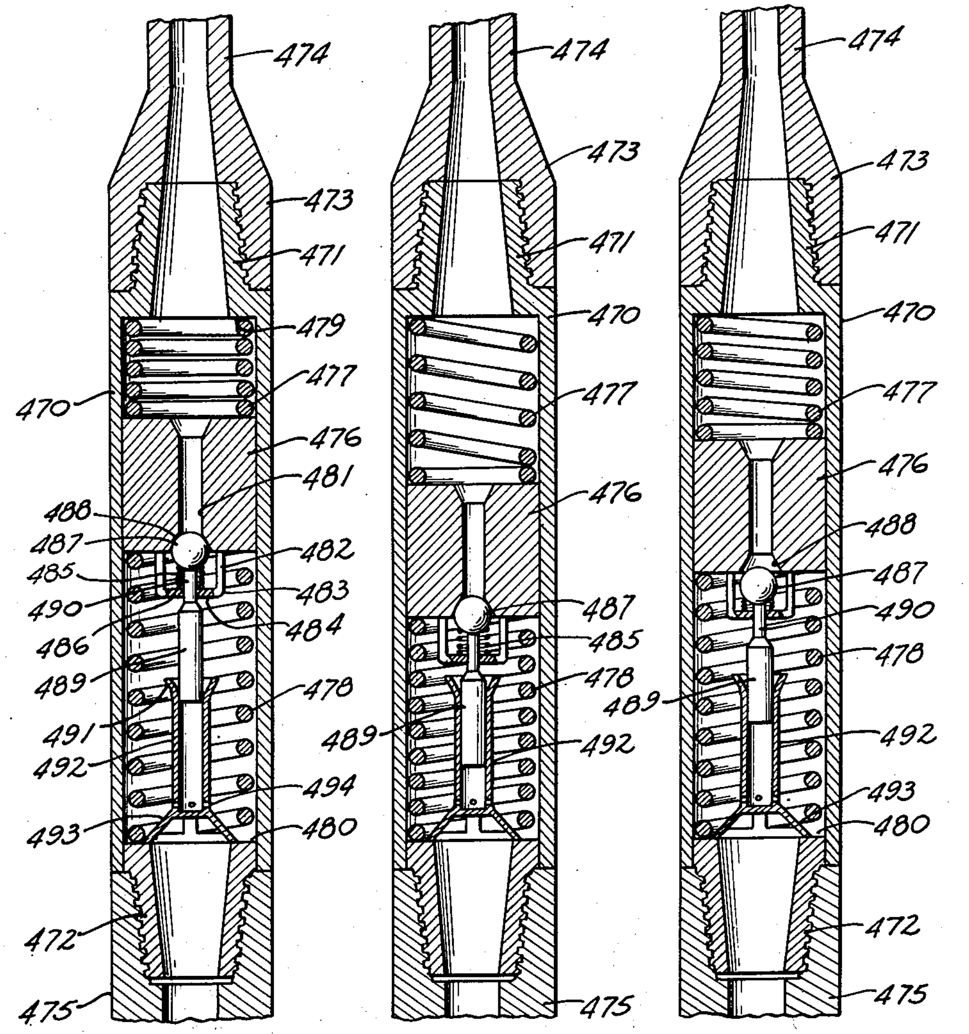
Figure 26:
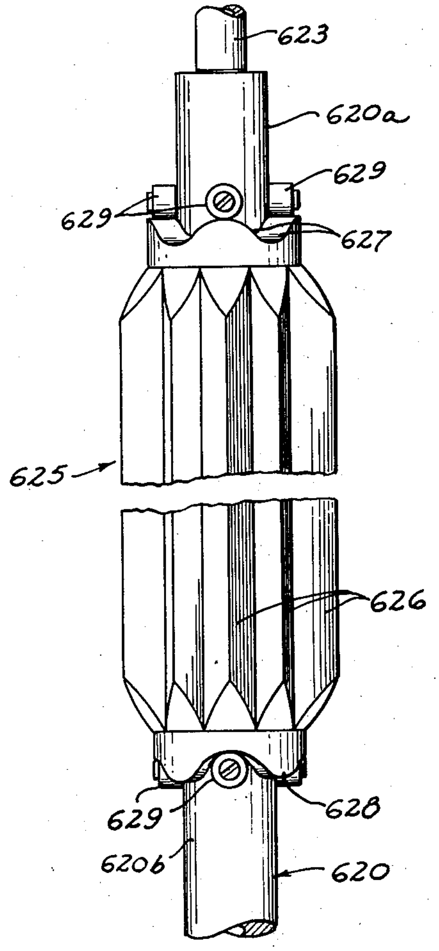
Figure 27:
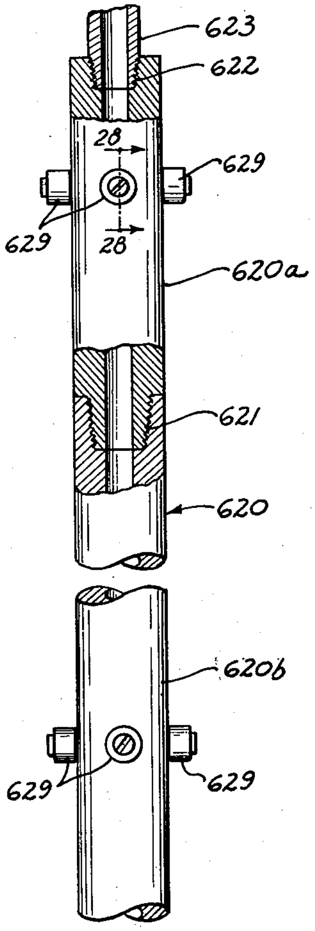
Figure 28:
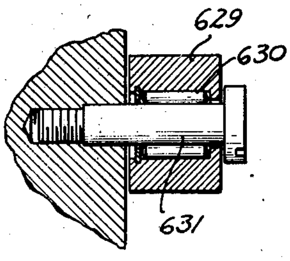

Figure 6*a* is a transverse section taken on line **6*a*—6*a*** of Figure 6;

Figure 7 is a transverse section taken on line 7—7 of Figure 6;

Figure 8 is a detail section taken on line 8—8 of Figure 6;

Figure 9 is an elevational view, partly in section, showing a sub intercoupling the vibrator to the upper end of the drill collar string;

Figure 10 is a longitudinal section, with parts broken away, of the vibratory drill collar string and bit, being a section taken on line 10—10 of Figure 1*a*;

Figure 11 is a diagram illustrative of the cyclic deformation action of the vibratory drill collar string;

Figure 12 is a diagram illustrative of standing wave patterns exhibited along the drill collar string;

Figure 13 is a diagram following the resonant behavior of the vibratory drill collar string;

Figure 14 is a diagrammatic, partly elevational, and partly sectional, view of another embodiment of the invention;

Figure 15 is an enlarged view showing the drilling assembly proper of the embodiment of Figure 14, with the bit members expanded;

Figure 16 is a section taken on line 16—16 of Figure 15;

Figure 17 is a view, partly in elevation, and partly in section, of another embodiment of the invention;

Figure 17*a* shows a modified form of bit;

Figure 18 is an enlarged section taken on line 18—18 of Figure 17;

Figure 19 is a longitudinal sectional view of a modified form of vibration generator;

Figure 19*a* is a transverse section of line **19*a*—19*a*** of Figure 19;

Figures 20, 21 and 22 are longitudinal sectional views showing successive operative positions of another vibration generator in accordance with the invention;

Fig. 23 is a partially sectioned and partially elevational view showing another embodiment of the invention;

Figure 24 is a view partly in longitudinal section and partly in elevation showing another embodiment of the invention;

Figure 25 is a transverse section taken on line 25—25 of Figure 24;

Fig. 26 is an elevational view of another embodiment of the invention;

Figure 27 is a view of the apparatus of Figure 26, with the vibratory sleeve removed, and parts broken away to show in section;

Figure 28 is a section on line 28—28 of Figure 27; and

Figure 29:
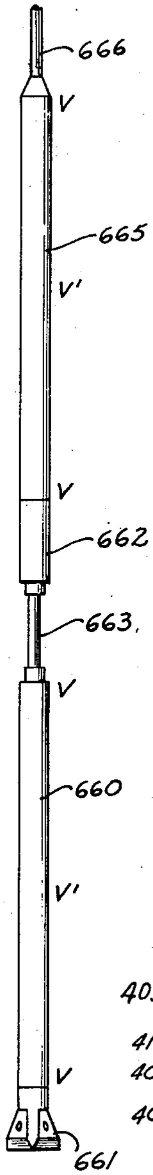

Figure 29 is an elevational view of still another embodiment of the invention.

Reference is first directed to Figures 1 to 10, which show in detail one present illustrative embodiment of the invention. At the ground surface (Figures 1 and 2) is the usual conventional drilling equipment, including derrick 50, draw works 51 driving rotary table 52, kelly 53 extending through table 52, swivel 54 coupled to the upper end of the fluid passage through kelly 53, and hook 55 supporting the bail of swivel 54. Hook 55 is in turn suspended through travelling block 56 and cable 57 from the usual crown block (not shown) at the top of the derrick, and the cable 57 is wound on the usual hoisting drum of the draw works. Mud fluid, such as is conventionally employed in rotary oil well drilling, is pumped through a supply pipe 58 from the supply tank or sump by means of mud pump **58*a* and is delivered under pressure from said pump via pipe 60 and hose 61 to the gooseneck of swivel 54, whence it flows down through kelly 53** to the drill pipe string coupled to the lower end of the kelly.

The bore hole 65 is lined for a suitable distance down from the ground surface by surface casing 66, which is supported by landing flange 67 resting on cement footing 68 in the bottom of pit 69. Mounted at the head of casing 66 is any suitable blowout preventer 70, and above the latter is riser 71 provided with mud flow line 72, this riser 71 being understood to communicate with casing 66 through blowout preventer 70. Mud delivery pipe 72 is shown discharging to conventional vibratory mud screen 73, and the mud is led from the latter back to the sump by way of pipe line 74.

Coupled to the lower end of kelly 53 is a conventional drill pipe string 75, and it will be understood that this pipe string will be made up of a number of usual drill pipe lengths coupled together by usual tool joints such as indicated at 76 (Figure 2).

The drilling assembly proper comprises, starting from the bottom: a bit 80; an elongated elastic longitudinally vibratory rod 81, of very substantial mass and length, in this instance made up of three conventional steel drill collars 82 connected end to end by subs 83 (Figure 9); and an elastic vibration generator assembly or combination, generally designated by the numeral 84, said assembly being suspended from drill pipe string 75 by means of a relatively long and heavy sub 85. The elastic vibration generator assembly comprises a mechanical vibrator 87, a motor unit 88, and a long two-part casing 89 interconnecting the motor unit with the vibrator.

The drill collars 82 making up the elastic rod 81 are typically about 40 feet in length, with an outside diameter of 8 inches, and formed with a longitudinal fluid circulation bore 82*a* having an inside diameter of 3 inches. Preferably, the cross-sectional area of the drill collar should be at least equal to, or greater than, that of a solid cylindrical rod whose diameter is half the diameter of the bore hole. This of course means that the hollow steel collars 82 will have an outside diameter somewhat over 50% of the diameter of the bore hole.

The collars 82 have taper threaded coupling boxes 90 at each end for reception of the taper threaded coupling pins 91 on the opposite ends of the subs 83 employed to join the collars into one solid elastic bar. In order to avoid local stress concentrations such as might lead to failure of the box ends of the collars in service, the bore 82*a* of the collar is joined to the box 90 at each end by a smooth concave curve 92 forming a section 93 of reduced wall thickness, and therefore increased flexibility. This flexibility prevents severe stress concentrations at the box, and relieves the tendency for failure at that point.

The subs 83 have longitudinal circulation passages communicating with the collar bores 82*a*, and they are preferably reduced in wall thickness as indicated at 94, to improve flexibility and thereby avoid a tendency toward failure of the coupling pins 91.

The lowermost of the collars 82 receives in its coupling box 90 the threaded pin 91 on the upper end of a suitable bit 80. The bit 80 may be of various types, but a simple form which has operated satisfactorily in practice is a wing type having four wings 96, formed as clearly illustrated in Figure 10. The bit also has circulation passageway 97 communicating with the fluid passage through the collars, and provided, between the wings 96, with lateral fluid discharge ports 98.

The uppermost collar-coupling sub 83 has at the top a somewhat enlarged threaded coupling pin 91*a*, screwed into the threaded lower end 99 of the tubular casing 100 of vibrator 87. This vibrator 87 may be any suitable type of mechanical vibrator designed to generate a cyclic force in a direction longitudinal of the elastic vibratory rod 81, and at the frequency of a longitudinal resonant elastic vibration of said rod. By the term "mechanical vibrator" is meant, not necessarily one formed exclusively of mechanical parts or links, but one having a mechanically moving mechanism within it. One satisfactory type of mechanical vibrator is of an inertia weight type, comprising a plurality of eccentrically weighted rotors, arranged to balance out lateral components of vibration, but to produce a summation of vertical components, so that there is a substantial resultant of vertically directed alternating force. Such a vibrator is shown in Figures 6, 7 and 8, and will now be described.

The upper end of the vibrator casing 100 is bolted to the lower end of the aforementioned casing 89. As here shown, the upper end of casing 100 has welded thereto the outer casing portion 101 of a spider member 102, and said casing portion 101 is necked in towards the top, and there provided with an outwardly extending bolt flange 103. In similar manner, there is welded to the lower end of sleeve 89 the outer casing portion 104 of a spider member 105, and the casing 104 is necked in, and then flanged outwardly, as at 106, to provide meeting flanges 103 and 106 which are connected by bolts 107.

The spider member 102 has, annularly spaced inside its casing portion 101, an inner sleeve portion 110, connected to casing portion 101 by webs 111 spaced to provide circulation passages therebetween, and this sleeve portion has at its lower end an inwardly turned mounting flange 112. A closure head 113 is secured inside sleeve 111, and has an outwardly extending flange 114 at its upper end shouldering down against the upper end of sleeve 112. This head 113 is formed with a bore 115 for a vertical transmission shaft end 116, and is counterbored from the top and threaded to receive packing and a packing nut, as indicated.

The transmission shaft end 116 is hollow and formed with longitudinal splines 120 engaging longitudinal splines 121 on a vibrator drive shaft 122. The lower end of the latter has a bevel gear 123 meshing with a bevel gear 124 formed near one end of a gear sleeve 125 whose other end carries a spur gear 126 driving the uppermost of the previously described eccentrically weighted rotors.

Drive shaft 122 has a downwardly facing shoulder 130 engaging the inner ring of a ball thrust bearing 131, the outer ring of which is received in a cylindrical bearing housing 132. This housing has an external flange 133 near the top adapted to engage and be supported by the aforementioned sleeve flange 112, screws 134 securing said members in assembly. At its lower end bearing housing 132 is flanged inwardly, as indicated, to support radial ball bearings 135 for the drive shaft 122, all as clearly illustrated in Figure 6.

Two parallel, vertical cheek plates 140 and 141 are welded at their longitudinal edges to the interior surface of casing 100, and provide an interior housing space 142, and two longitudinal vertical passageways 143 at the sides for circulation of mud fluid. These plates 140 and 141 extend from a point just below the lower end of sleeve 111 to a point nearly to the lower end of casing 100. A closure member 145 has a head portion which is supported against flanges 112 by the aforementioned screws 134, and which is centrally bored to snugly embrace the bearing housing 132. This closure member 145 is shaped at the bottom to be snugly received at two opposite sides inside the cheek plates 140 and 141, and at its two remaining sides to engage the interior surface of the casing 100, and is welded all around to the plates 140 and 141 and to the inner surface of the casing 100, so as to close off the vibrator housing space 142 at the top from the annular space 148 between the members 111 and 145, and casing 100. Accordingly, mud fluid within said space 148 can flow downwardly through the casing 100 by way of the previously described mud passages 143, but is excluded from the housing space 142. The housing space 142 is closed at the bottom by a bottom closure plate 150 secured to cheek plates 140 and 141 by screws 151, and it will be understood that the ends of this plate are rounded so as to contact the inside surface of casing 100 between the plates 140 and 141. A rubber gasket 153 is placed on top of plate 150, and a clamp plate 154 resting on gasket 153 carries studs 155 which extend down through the gasket and through closure plate 150. After the parts are assembled, nuts 156 are set up on these studs, and draw clamp plate 154 downwardly to squeeze the rubber gasket laterally against the plates 140 and 141 and against the surface of casing 100 so as to provide a seal against the mud fluid.

The closure member 145 has two depending extensions 157 fitted just inside the cheek plates 140 and 141 and seated against shoulders at 158. These extensions 157 carry a transverse shaft 159 which extends through gear sleeve 125 and which supports the inner ring of ball bearings 159*a* whose outer rings support the aforementioned bevel gear 124 and spur gear 126.

Spur gear 126 meshes with a spur gear 160 on the upper of a series of eccentrically weighted rotors 161 mounted in vertically spaced relation in the housing space 142. Each rotor 161 is mounted on a transverse shaft 162 extending through cheek plates 140 and 141 and set into the walls of casing 100. Mounted on these shafts, just inside cheek plates 140 and 141, are the inner rings of ball bearings 163, and the rotors 161 are formed to embrace the outer rings of these bearings. It will be seen that the rotors consist essentially of inertia weights 166 located at one side of the shafts 162, and that the bearings are seated partially in these inertia weight members and partially in substantially half-round straps 167 extending from the weights. At one side, the weight 166 is cut away, and the strap is enlarged, to form a seat for the aforementioned spur gear 160, which may be provided with a shrink fit on the rotor.

The spur gear 160 of the uppermost rotor 161 meshes with the corresponding spur gear 160 of the second rotor 161, and the latter gear 160 meshes with an idler gear 170 carried by a transverse shaft 171 mounted on the cheek plates and casing in the same way as the shafts 162. This idler 170 meshes with the spur gear 160 of the third rotor 161, and the gear of the third rotor meshes with the gear of the fourth, all as clearly shown in Figure 6. The several rotors are all arranged so that their unbalanced weights 166 move up and down in unison, which is accomplished if for instance they are all initially positioned with their weights at the bottom, as in Figure 6.

It will be evident that each eccentrically weighted rotor will exert a thrust at its bearing as it rotates. Only the thrust in the vertical or longitudinal direction is however useful, lateral components being not only useless but tending to produce severe lateral vibrations unless balanced out. By arranging the rotors in pairs of oppositely rotating members, the vertical components of thrust are additive, while lateral components are cancelled. The preferred arrangement shown includes two such pairs of unbalanced rotors, and it can readily be seen that, with the rotors all arranged to move vertically in unison, and with the two rotors of each pair arranged to turn in opposite directions, the vertical force components will be additive while the lateral components are balanced out. In addition, by use of the idler 170, the lateral force thrusts of the two inside rotors are always in the same direction, with the result that couples are also balanced out.

Accordingly, I have provided a simple, powerful device for producing a longitudinally directed alternating force, with no unbalanced lateral force components, and with no unbalanced couples. In effect, I have a device with longitudinally reciprocating inertia weight elements, which oscillate along a vertical or longitudinal direction line with simple harmonic motion, and which exert an alternating force at the bearings along the longitudinal direction line in accordance with their vertical component of acceleration and deceleration.

The resulting reaction at the rotor bearings is a vertically directed cyclic or alternating force, which is transmitted to the casing 100, and thence to the upper end of the vibratory elastic rod 81 through the uppermost sub 83.

The vibration generator includes, in addition to the vibrator 87 just described, a suitable motor unit 88 for driving the vibrator. While there are available many types of motor suited to the requirements of the invention, I here show a hydraulically driven type comprising a series of turbines designed to be driven by the mud fluid circulated through the system. The present motor unit, accordingly, includes a tubular turbine casing 180. The upper end of this casing has a threaded coupling at 181 to a relatively short length of casing 182, which is in turn coupled at its upper end to the relatively heavy sub 85. This sub 85 may typically have a cross-section similar to the drill collars, and may be of about 12 feet in length. At the lower end, this sub has a threaded pin 183 by which it is coupled into the upper end of the casing section 182, and at its upper end it may have a threaded box 184 for reception of the pin 185 on the lower end of the last section of drill pipe, as clearly indicated in Figure 2.

Figures 3, 4, 5:
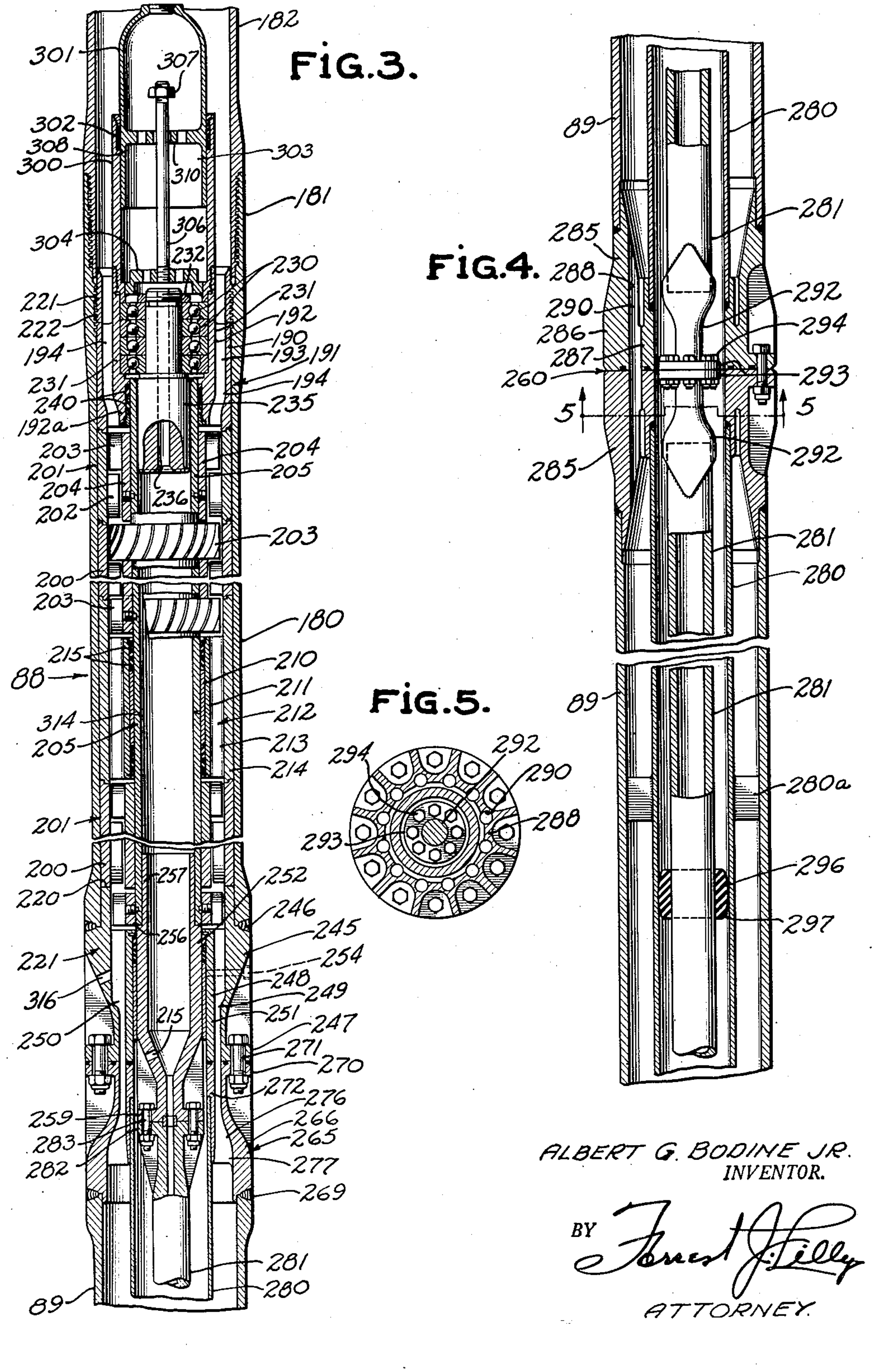
Figure 3 is a longitudinal sectional view of the drive motor unit of the drilling apparatus, Figure 3 including the lower end portion of the string shown in Figure 2 (but to a larger scale), and showing also the upper portion of a transmission shaft section of the apparatus.
Figure 4 is a longitudinal sectional view of a portion of the transmission shaft section of the apparatus which follows below the motor unit of Figure 3.
Figure 5 is a transverse section taken on line 5—5 of Figure 4.

Snugly received in the upper end portion of turbine casing 180 is the outer tubular member 190 of a spider 191, said spider including an inner tubular member 192 annularly spaced inside but connected to the member 190 by means of webs 193. These webs 193 will be understood to be so spaced as to provide an annular series of fluid circulation passages 194 extending downwardly therebetween. The tubular members 190 of spider 191 rests on and is supported by the stator sleeve 200 of the uppermost of a series of turbine units 201, the sleeve 200 being snugly but removably fitted inside casing 180, and a plurality of such sleeves of successive turbine units being stacked on one another, as indicated. Referring to the uppermost turbine unit shown in Figure 3, the stator sleeve 200 has within its lower half a plurality of stator blades 202, and a plurality of rotor blades 203 are located just above blades 202, being formed on the upper half of a rotor sleeve 204 mounted concentrically within stator sleeve 201 on hollow turbine shaft 205. These turbine units may be of a conventional type, and further detailed description will accordingly not be necessary. There may be a number of these turbine units as desired; for example, a present embodiment has two series of turbine units of nine turbines each, separated by an intermediate bearing. In Figure 3, portions of the two series of turbine units have been broken away, and it is to be understood that as many turbine units may be employed as will be appropriate for the power requirements of the apparatus.

As will be seen from Figure 3, the annular blade space between the stator and turbine sleeves 200 and 204 is open at the top to receive mud fluid flowing downwardly through the passageways 194 of spider 191. This mud fluid passes downwardly through the turbine units in succession, imparting rotation to the rotors and so driving the turbine shaft 205.

The intermediate turbine shaft bearing comprises a bronze sleeve 210 received inside the inner sleeve member 211 of a spider 212, and the sleeve 211 being connected by spaced webs 213 to outer sleeve 214 which is snugly but removably received inside casing 180. Mud seals 215 are placed in the annular space between the turbine shaft and spider sleeve 211, at the two ends of bearing sleeve 210, and these mud seals may be secured in position by any suitable retainer device. The outer sleeve 214 of spider 212 engages the lowermost stator sleeve 200 of the stack of turbines above, and the spider is formed to accommodate, above inside sleeve 211 and within the upper portion of outer sleeve 214, an additional bladed turbine rotor having a short rotor sleeve 204*a* secured on the turbine shaft. The lower end of the outside sleeve 214 of the intermediate bearing spider 212 rests on the stator sleeves 200 of the second series of turbine units 201, which may be like the series already described, even to inclusion of the final additional rotor unit mounted on the turbine shaft below the lower end of the last turbine stator 200. The lowermost stator sleeve 200 will be seen in Figure 3 to engage the shoulder 220 formed at the top end of a coupling spider 221 to be further described hereinafter. Thus the entire series of stator sleeves, including intermediate bearing spider sleeve 214, and including also the outside sleeve 190 of spider 191, are stacked one on top the other and rested on this shoulder 220. This assembly is held in compression by a nut member 221 screwed into a threaded section 222 of casing 180 and engaging downwardly against the upper end of spider sleeve 190.

The aforementioned inner sleeve 192 of spider 191 consists of a housing for a plurality of thrust bearings 230 for the upper turbine shaft end 231. Thus, the outer race rings of the bearings 230 are supported by annular upwardly facing shoulders 231 formed inside the housing 192, while the inner rings of said bearings embrace the turbine shaft end 231, as shown. The extremity of shaft end 231 is threaded to receive a nut 232, which engages downwardly against the inner race ring of the uppermost thrust bearing 230, and it will thus be seen that the turbine shaft is suspended through the nut 232 from the inner race rings of the bearings 230. The turbine shaft end 231 comprises a short shaft section 234 tightly fitted in the upper end portion of hollow turbine shaft 205, and welded thereto as indicated at 235. Above this weld point, the shaft has reduced end portion 231 embraced by the inner rings of the bearings 230. The shaft 231, 234 is formed with central longitudinal bore 236 to permit passage of lubricating oil, as hereinafter more fully explained. Mud seals 240 placed between the upper end of the turbine shaft 205 and a downward extension 192*a* of bearing housing 192 prevent leakage of mud fluid to the bearings 230.

The previously mentioned coupling member 221 is in the nature of a spider, having an outer casing portion 245 welded to the lower end of casing 180, as indicated at 246, and this outer casing portion 245 is necked in, and then formed with a terminal bolt flange 247. The member 245 also has a sleeve extension 245*a* which extends up inside casing 180 to afford the aforementioned turbine supporting shoulder 220. The coupling member or spider 221 also includes inner sleeve portion 248, annularly spaced inside casing portion 245, and connected to the latter by spaced webs 249, between which are downwardly extending circulation passages 250 for the mud fluid. The inner sleeve member 248 confines a bronze bearing sleeve 251 which supports the lower end section 252 of the turbine shaft. The bearing sleeve 251 is removably positioned in the annular space between the turbine shaft section 252 and spider sleeve 248 by means of a screw 254. The turbine shaft section 252 consists of a hollow tubular member, welded to the lower end of turbine shaft member 205, as indicated at 256, and having a reduced end portion 257 extending telescopically upward inside the lower end portion of turbine shaft member 205 for some distance, as indicated. The lower end portion of the turbine shaft section 252 is necked down and then formed with a terminal bolt flange 259, located preferably a few inches below the bolt flange 247 at the lower end of the turbine casing. It is found desirable, for a reason to be explained hereinafter, to have the motor considerably spaced from the vibrator, and for this purpose, I connect the turbine shaft and turbine casing to the vibrator drive shaft and the vibrator casing by a relatively long section of transmission shaft and exterior casing. Thus, I may employ a long cylindrical casing 89, formed, for convenience, with a break joint at 260. In a typical apparatus in accordance with the invention, employing an elastic rod 81 of a length of the order of 120 feet, this casing 89 may have a typical overall length of approximately 60 feet, that is to say, approximately one-half the length of the vibratory elastic rod 81 made up of the three forty foot drill collars. This casing member 89 may be formed satisfactorily of two coupled lengths of ordinary well casing. At the upper end of the casing 89 there is provided a coupling member 265 in the nature of a spider whose outer casing member 266 is welded to the member 89, as indicated at 269, and which is necked in and then formed with a terminal bolt flange 270 presented in opposition to bolt flange 247, and connected thereto by bolts 271. Spider 265 also has an inner sleeve member 272 whose upper end is presented toward and meets the lower end of the sleeve portion 248 of the coupling spider 221 above. Suitable sealing means of any appropriate nature are provided between the abutting ends of the sleeve members 248 and 272 in order to prevent mud fluid from entering in between these members. Also, suitable seals will preferably be provided between the two abutting flanges 247 and 270. The inside sleeve member 272 of the spider 265 is annularly spaced inside outer spider member 266, and connected thereto by webs 276, which are spaced apart to leave circulation passages 277 therebetween. It will be seen that these circulation passages 277 aline with the circulation passages 250 in the coupling spider 221 above.

Tightly set into the inner sleeve 272 of spider 265 is the upper end of a transmission shaft housing tube 280, and the transmission shaft 281 has at its upper end a coupling flange 282 connected by bolts 283 to turbine shaft flange 259. The tube 280 extends down and into a sleeve member 284 connected by spaced webs 284*a* to the outer portion 104 of the aforementioned spider 105 at the lower end of casing 89. The tube is centered within the casing 89 by means of ribs 280*a* welded to the tube and engageable with the casing.

The previously mentioned coupling 260 consists of similar spider members 285 mounted on the adjacent ends of the two sections of casing 89. These spiders 285 each comprise an outer thick-walled casing portion 286 welded to the casing 89, and an inside sleeve member 287, annularly spaced inside the casing portion 286 and connected thereto by spaced webs 288, so as to leave a plurality of circulation passageways 290 therebetween. The two adjacent ends of the broken drive shaft housing sleeve 280 are fitted inside and welded to the inner sleeve member 287. The transmission shaft 281 is also provided, at the location of coupling 260, with bolt connected flanges. As shown in Figure 4, the two adjacent ends of shaft 281 are welded into fittings 292 formed at their adjacent ends with flanges 293 connected by bolts 294. To center the transmission shaft 281 within the housing 280, the shaft 281 is provided with a plurality of longitudinally spaced bearings in the form of sleeves 296 tightly mounted on the shaft 231 and formed with a convex bearing surface 297 engaging the interior surface of the housing tube 280. These sleeves 292 are preferably formed of suitable plastic material, such as fabric filled phenolic resin. The lower end of the lower section of the transmission shaft 281 is reduced to form the aforementioned internally splined shaft section 118 which drivingly engages the vibrator drive shaft 121 in the manner shown in Figure 6.

Lubrication for the turbine and turbine shaft bearings is provided by locating a body of oil above the bearing housing shoulder 192 at the top end of the turbines. As shown, the upper end of the sleeve member 192 is internally threaded to receive the threaded lower end of oil cylinder 300, and telescopically receivable within this cylinder 300 is a cylindrical chamber member 301, suitable packing being provided at 302 to prevent leakage of oil contained within the expansive and contractive enclosure 303 thus provided. A spider 304 mounted in the lower end of cylinder 300 carries an upwardly extending rod 306 having threaded on its upper end a stop nut 307. The chamber member 301 has an integrally formed spider 308 extending thereacross, and with a central aperture 310 for passage of the shaft 306. Oil is initially poured inside the cylinder 300, and flows down to the bearings 230, and also flows downwardly through the passageway 236 in turbine shaft member 231 to fill in the hollow space inside turbine shaft 205. This oil escapes through oil holes such as 314 in the turbine shaft to lubricate the turbine shaft bearings. The oil also escapes from the hollow turbine shaft through a port 315 to enter the top end of drive shaft housing tube 280 which it fills down to the head 113 at the top end of the vibrator. This oil within the housing tube 280 lubricates the transmission shaft bearings 296. The purpose of the telescopic arrangement of the chamber member 301 when in the cylinder 300 is to provide for expansion of the oil body contained within the apparatus with temperature rises during operation.

Lubrication of the vibrator 87 is taken care of by simply introducing a suitable quantity of oil inside the housing space 142 at the time of initial assembly. This oil is splashed about by the rotors in such a way as to assure lubrication of all of the rotors and shaft bearings within the vibrator.

In operation, the usual mud fluid employed in drilling operations is delivered by mud pump 58*a*, and the previously described conventional fittings, to the hollow drill pipe string 75, whence it flows downwardly to and through sub 85, casing 182, and through the fluid passageways in spider 191, to the first turbine unit 201. The mud fluid passes through the rotors and stators of the several turbines in an axial direction, setting the turbine rotors, and the turbine shaft 205, into continuous rotation at a speed determined by the rate of mud flow as governed by the speed of operation of mud pump 58*a*. The mud delivered downwardly from the last turbine unit is received by the fluid passages 250 through the coupling spider member 221. At this point, some of the mud fluid can, if desired, be discharged to the bore hole, particularly in cases where a large mud flow rate is required for the drive of the turbines. Thus, mud fluid discharge ports 316 may be employed for discharge of any excess mud fluid. In any event, sufficient mud fluid to serve the usual functions in oil well drilling will flow downwardly through the fluid passages 250 in coupling spider 221, to be received by corresponding fluid passages 277 in coupling spider 265 immediately below. The mud fluid then passes downwardly in the annular space between drive shaft housing 280 and casing 89, passing the coupling 260 by way of the passageways 288 in the spider 285. At the coupling between the lower end of casing 89 and vibrator casing 100, the mud fluid passes downwardly through the fluid passages of the coupling spiders 105 and 102, thence being received in the passageways 143 at the two sides of the rotor enclosure. At the lower end of the vibrator casing 100, the fluid is discharged downwardly from the passages 143 into and through the sub 83, from which it passes in succession through the several drill collars 82 making up the vibratory rod 81. Finally, this mud fluid, having reached the interior of bit 80, is discharged to the bore hole by way of the laterally opening ports 98.

The mud fluid accordingly drives the turbines, which rotate the elongated transmission shaft 281 and the vibrator drive shaft 122. Rotation of this vibrator drive shaft 122 operates through bevel gears 123 and 124 and the previously described spur gears to drive the eccentrically weighted rotors in a manner heretofore explained, whereby a cyclic or alternating force is generated in a direction longitudinally of the apparatus and is transferred to the vibrator casing 100, thence to the longitudinally vibratory elastic drill collar rod 81, and from the latter to the bit. The drill rod 81 does not, however, vibrate bodily. The turbines are driven by the mud stream at a speed to operate the vibrator at a longitudinal resonant frequency of the rod 81, causing the rod to exhibit a longitudinal standing wave pattern of vibration characterized (assuming the simple case of fundamental frequency operation) by a substantially stationary center portion, and opposite end portions which vibrate in a longitudinal direction. The bit connected to the lower end of the rod is therefore vibrated longitudinally against the formation. Preferably, the drill string is at the same time slowly rotated by means of the rotary table, but this is not for the purpose of rotary cutting, but rather to permit the bit to work progressively over the area of the hole bottom.

To understand the vibratory action occurring within the apparatus, a somewhat detailed analysis must be undertaken. The alternating force previously described as exerted on the upper end of the rod 81 by the turbine driven vibrator sends alternating waves of compression and tension travelling down said rod with the speed of sound. Reaching the lower end of the rod (and, of course, the bit), these waves are reflected to travel back up the rod, to be again reflected by the upper end of the rod, and so on. If the upper end of the rod is effectively "terminated," i. e., "isolated" from the equipment above, the upwardly travelling wave will be reflected at the top end of the rod, to retraverse the rod in a downward direction, and so on. Such termination or isolation may be accomplished by introduction of a flexible member between the rod and the equipment above, or by employment of a substantial change in cross-section, or both, the principal purpose being to introduce a compliant member or section between the vibratory rod and the suspending pipe string above. In the embodiment of Figures 1 to 10, the vibrator 87 must be regarded as a part of the vibratory system, since its mass per unit length is sufficiently close to the mass per unit length of the rod that wave reflection will not be sufficiently complete below the upper end of the vibrator. However, the casing 89 and transmission shaft housing tube 280 are sufficiently thin-walled to function as a compliance or flexible coupling possessed of sufficient flexibility to effectively isolate the vibratory rod and generator from the equipment above. It will be noted that the splined connection between the transmission shaft 281 and the vibrator drive shaft prevents transmission of longitudinal vibratory energy upwards through the shaft 281. It may now be appreciated that not only the vibratory rod 81, but also the vibrator 87, and indeed the bit 80, must be regarded as forming parts of the longitudinally vibratory system, and the overall length of these intercoupled members is, in effect, the fixed length of the vibratory "rod." Some small leakage of vibratory energy will of course inevitably take place from the upper end of the vibrator 87 up the relatively thin-walled casing 89 and housing tube 280, but this leakage is small in proportion, and in any event, is further handled in a manner to be set forth hereinafter. Thus, as may now be seen, when I refer to wave reflection at the ends of the vibratory elastic rod 81, I have in mind the fact that the effective length of the rod 81 includes not merely the drill collars 82, but the vibrator 87 and bit 80 as well.

Considering the downwardly travelling wave of compression in the rod, this wave is reflected in inverted form from the lower end of the rod as a wave of tension travelling back up the rod, and when this wave of tension is reflected back down from the upper end of the rod, it is inverted back into a downwardly traveling wave of compression. If now just as such a returning wave is being inverted and reflected back down the rod as a wave of compression, a new downward force impulse is exerted on the upper end of the rod, the downwardly travelling wave of compression will be reinforced and amplified in magnitude. The waves of tension transmitted down the rod by the upward exertions of force on the upper end of the rod occurring between the downward force exertions are reflected from the lower end of the rod as waves of compression, and upon the latter reaching the upper end of the rod, they are reflected back down the rod as waves of tension. If an alternating force of proper frequency is acting on the upper end of the rod, not only will a downward force be exerted on the rod coincidently with the departure in a downward direction of each wave of compression, but an upward force will be exerted on the rod coincidently with the departure in a downward direction of each wave of tension. Strongly amplified traveling waves of both compression and tension are obtained when the alternating driving force has a frequency to be thus in step with the arrivals and departures of the travelling waves of compression and tension from the ends of the rod.

The waves of compression and tension are elastic deformation waves which will alternately contract and elongate any given section of the rod as they pass through it. Furthermore, the amplified waves of compression and tension (contraction and elongation) travelling down the rod will encounter the reflected waves of compression and tension returning up the rod, and there will be certain interferences between the waves. In accordance with the established theory of longitudinal elastic waves in elastic rods, if the alternating driving force acting on the upper end of the rod has a frequency substantially equal to the fundamental resonant frequency of the rod, the deformation waves travelling up and down will cancel upon meeting at the mid-point of the rod but will be additive at the end portions of the rod. The mid-section of the rod hence stands stationary, though it nevertheless undergoes a stress cycle. This condition at the mid-point of the rod is known as a velocity node (region of minimum deformation amplitude); it is also known as a stress anti-node (region of maximum cyclic stress amplitude). The two half-sections of the rod alternately elongate and contract, the extreme end portions of the rod having the maximum amplitude of motion, and the condition of maximum deformation amplitude at these end portions is known as a velocity anti-node. This action is illustrated in the diagram of Figure 11, which shows at F the alternating force wave, at *s* the deformation velocity wave, and below, at successive positions, *a*, *b*, *c*, *d*, and *e*, the contracting and elongating rod 81, positions *a*, *c*, and *e* showing the rod at its normal length, while *b* and *d* are the positions of contraction and elongation, respectively. It will be noted that the center point of the rod, at velocity node V', is stationary, while the end portions (velocity anti-node regions V) undergo maximum amplitude of longitudinal oscillation. Points along the rod from the center outwards in each direction participate in this oscillation to a greater and greater extent as the velocity anti-node regions are approached. This type of phenomena is known as a longitudinal standing wave, one-half wave in length, in this instance. The velocity wave is of course always 90° out of phase with respect to the wave of displacement. The system is usually and preferably operated with the generator frequency in the range of resonant amplification of the rod 81, but slightly on the low side of the peak of the resonance curve. This results in some lag of the wave F of exerted alternating force with respect to the velocity wave *s*.

Figure 12, at *a*, shows a conventional diagram of a one-half wave length standing wave, achieved when the driving force F has the fundamental frequency $f=S/2L$, S being the speed of sound in the material of the elastic rod, and L being the length of the rod. The dimension *w* represents the amplitude of oscillation of various points along the length of the rod. This diagram nicely represents the minimum amplitude condition at the midpoint velocity node region V' and the maximum oscillation amplitude at the velocity anti-node regions V.

It is important to recognize that the described standing wave condition is obtained when the alternating driving force is generated at a longitudinal resonant frequency of the rod, either the fundamental, or some harmonic. Figure 12, at b, shows the theoretical full wave length standing wave, achieved when the driving force has the harmonic frequency S/L and it will be seen that in this case, there are three velocity anti-nodes V and two velocity nodes V', all spaced a quarter wave length apart. By employing a resonant frequency driving force, the amplitude of vibratory movement of the end portions of the rod becomes very greatly amplified, reflecting the fact that force consuming vibratory masses of the system have been "tuned out," and that force delivery at the bit has been commensurately improved.

It has been mentioned that the substantial reduction in cross-sectional area immediately above the vibrator, as well as the flexibility of the relatively thin-walled casing 89 and tube 280, prevent transmission of substantial vibration energy up said members to the motor, and on up the drill pipe. This is important, not only to conserve vibration energy, but also to avoid shaking the motor (in this instance, the series of turbines). To further reduce the tendency for vibration at the location of the motor, the latter is preferably spaced a quarter-wave length, or slightly more, from the upper end of the elastic rod, which in this instance will be a spacing distance of about 60 feet. This establishes a velocity node condition near the motor, so that the motor tends to be entirely free from vibration. In order to make this still more certain, the heavy sub 85 is preferably directly connected to the motor, and what little vibratory energy reaches the region of the motor is then incapable of shaking the motor, even if the motor is located at some distance from the ideal wave increment spacing from the end of the rod 81. The further substantial reduction in cross-section between the sub 85 and the drill string 75 completes the isolation of the vibratory system from the drill string above.

In the embodiment of Figures 1 to 10, the vibratory rod has been described as typically composed of three 40 foot drill collars coupled together, giving a rod length of 120 feet. The resonant frequency for this rod length is in the range of 60 cycles per second, and I have successfully drilled in hard unweathered California granite using such a rod length and frequency. I have also successfully drilled in the same formation using a double length rod, 240 feet, and the same vibration frequency, the rod then vibrating at its first overtone (full wave action, as in Figure 12 at *b*).

In practice, the elastic rod 81 may be variously shaped, often tapered from one end to the other, as hereinafter described, or it may carry a "lumped" mass near one end, or by pressural engagement with the "work," it may become partially coupled to the work and behave as though some part of the work were moving with the rod. Under such practical conditions the resonant frequency may be somewhat lowered, and the wave length lengthened, causing the velocity and pressure anti-nodes to become shifted somewhat. Thus the pressure anti-node may be displaced downwardly, as shown in 12*c* and 12*d*, and the lower end of the rod, while having a substantial degree of oscillatory movement, may no longer be a substantially pure velocity anti-node region, but may have some degree of stress cycle along with its oscillatory movement. The upper end of the rod will normally remain a velocity anti-node region. Taking such considerations into account, it is seen that while the expression S/2L may define the theoretical resonant frequency for the fundamental frequency standing wave action illustrated in Figure 12*a*, in practice, some departure is likely to be encountered. In general, to establish a fundamental frequency standing wave, the necessary frequency will be substantially S/4L, or greater, and it can best be found in any given situation by varying the frequency of the alternating driving force in the region from S/4L to S/2L, or at whole multiples thereof, until resonance is made manifest by strongly amplified elastic vibration of the rod.

In drilling, the bit is preferably brought into a degree of initial pressural engagement with the bottom of the bore hole by lowering the drill pipe until a proportionate part of the weight of the assembly is borne by the formation. Under these conditions the formation can apparently be set into a substantial degree of forced elastic vibration with the bit. The bit most probably maintains contact pressure with the formation during a substantial part of the operating cycle, and may only leave the work momentarily during the upper portion of its stroke. The amplitude of vibration of the formation apparently increases with the initial biasing pressure, i. e., weight of the assembly loaded onto the hole bottom, and I find that this biasing or contact pressure should preferably be at least substantially one-twentieth the effective value of the large cyclic force at the stress anti-node of the rod. Under these conditions, the work gives way under the high stress cycle exerted by the bit, the failure being attributed largely to elastic fatigue failure. The criterion for this type of high speed drilling is a high cyclic stress in conjunction with a substantial biasing pressure.

The described maintenance of contact pressure between the bit and the formation couples the formation to the elastic rod 81 in such a way as often to somewhat lower the resonant frequency of the rod, and to relocate its velocity and pressure-anti-nodes. Figure 12, at *c*, shows how the velocity node V' may be lowered, while the lower velocity anti-node V might be said to have been shifted to a position below the lower end of the rod. It is probably more accurate to say that the lower velocity anti-node is no longer a pure velocity anti-node, the vibration amplitude of the lower end of the rod having been somewhat reduced, and the lower end of the rod now experiencing a certain stress cycle, which is transmitted through the bit to the work. In practice the frequency of the alternating driving force is varied or modified to follow the resonant frequency range determined primarily by the dimensions of the elastic rod, but partially by the degree of coupling to the formation. In general, this operational resonant frequency will not depart greatly from the value of S/2L, and will ordinarily be found between S/2L and S/4L, or at multiples thereof when overtones are being employed. Referring to the particular form of the invention disclosed in Figures 1 to 10, the mud pump 58a will typically and in most cases be driven by an internal combustion engine, prime mover, and the speed of this engine will of course be regulated to drive the mud pump at such a speed as will pump mud fluid through the turbines at a flow rate which will result in driving the vibrator 87 at the resonant frequency of the rod 81. This resonant frequency is easily found in practice simply by locating the speed of the prime mover at which resonant amplification of the vibratory rod 81 is obtained. In practice this can be accomplished in various ways, some of which will be noted hereinafter. When, as the result of coupling the bit and the resonant elastic rod 81 to the formation during drilling, the resonant frequency range tends to decrease slightly, the apparatus ordinarily will automatically speed-regulate itself to follow the resonant frequency. This may come about through slippage taking place between the mud stream and the turbines, and also, to some extent, by the tendency of an internal combustion engine to automatically speed-regulate itself to locate and follow the resonant frequency of a resonant load.

Figure 12, at *d*, shows the effect on the standing wave of coupling to the work when the generator is operating at overtone resonance at substantially double the fundamental resonant frequency.

Figure 13 is instructive as illustrating the modification of the resonance curve of the vibratory rod 81 by coupling to the formation during drilling. The curve R1 is the resonance curve (vibration frequency vs. vibration amplitude) with the bit uncoupled from the work. Assuming fundamental frequency half-wave operation, the frequency $f_1$ for the resonant peak is given by the equation $f_1=S/2L$. It will be noted that the curve R1 is relatively tall and sharp, characteristic of a high "Q" system with small energy dissipation. Curve R2 shows a typical modification resulting from a partial coupling of the rod and bit to the formation. First of all, the frequency $f_2$ for the peak of resonance is lowered somewhat from the value $f_1$. At the same time, the resonance curve becomes proportionately wider, and less tall, typical of resonant systems from which substantial energy is being delivered. The greater energy delivery in this case is of course that expended in working on the formation. Figure 13 also illustrates what I mean by the term "resonance" when I refer to the speed at which the vibration generator is to be operated. In this connection, I do not refer to the frequencies $f_1$ or $f_2$ for peak resonance values, but rather to the frequency ranges for substantial resonant amplification of vibration amplitude, i. e., the frequency ranges included under the humped resonance curves R1 and R2. Also it may be necessary to distinguish between the resonant frequency when uncoupled from the work and the resonant frequency when coupled to the work. The important resonant frequency of the rod 81, i. e., the frequency range of resonant amplification of said rod, is of course that corresponding to the coupled condition, and it is of course the latter resonant frequency, i. e., in the range under the curve R2, at which the vibration generator must be operated while drilling.

It has already been shown the need at the bit is for a high ratio of cyclic force to vibration amplitude. The invention utilizes a motor device of relatively high displacement rate, such as can be of relatively small bulk (so as to be capable of going into the bore hole), while still being capable of delivering the necessary power. In practice, a relatively high speed but low torque motor, such as the described bank of mud turbines, is well suited to the purpose, being easily designed to go into the bore hole, and being capable of furnishing the necessary power. A turbine is inherently a device of high displacement rate, and as already described, the illustrative turbine is designed to operate on a mud flow of several hundred gallons per minute. Its power receiving (mud driven) rotors will inevitably, however, run at a higher linear speed than the effective deformation stroke velocity of the vibratory portion of the rod 81 to which the vibrator is drivingly connected, and to permit the turbine to efficiently and effectively drive the vibratory rod and the bit, I provide an impedance adjustment between the turbine rotors and the point of driving connection with the vibratory rod. This impedance adjustment consists in a velocity reducing means provided between the turbine rotors and the point of connection of the vibrator with the vibratory rod 81, whereby the power at the turbine rotors, which is characterized by a low ratio of force to velocity, is converted into power at the bit characterized by a high ratio of force to velocity. The mud driven turbines constitute a motor means of high displacement rate, being capable of utilizing up to 300 or 400 gallons of mud fluid per minute, and of being driven thereby at several thousand R. P. M., delivering a torque of around 1500 inch pounds. The vibratory rod, made up typically of three 40 foot drill collars, is a member of considerable stiffness, with a feasible elastic deformation stroke limit of not over approximately ½ inch. Assuming half-wave operation, the generator frequency should be $S/2L=16{,}000/240$, or in the range of 66 cycles per second. The turbines as disclosed, coupled to the eccentrically weighted rotors of the vibrator, can readily be driven at a speed to generate this frequency. The vibrator may be designed, for the purpose of this illustration, to deliver an alternating force with a peak value of 40,000 pounds, which will in turn cause a maximum stroke of the vibratory rod of something in the neighborhood of $\frac{3}{16}$ to ½ inch. The vibrator with its heavy constrained inertia rotors will be seen to build up a high cyclic reactive force for exertion on the rod, and this force build up will be at the expense of velocity. From this example, it will be seen that in the present case, there is a very substantial velocity reduction, and a corresponding gain in force, between the turbine rotors and the point of driving connection between the vibrator and the vibratory rod and bit. In the broadest sense, what I have accomplished is an efficient, effective, coupling between a turbine of large displacement rate, and a bit operating with high cyclic force but at small effective linear velocity.

An important function of the elastic longitudinally vibratory rod 81 is energy storage (flywheel effect). In operation, the rod becomes a substantial energy storage reservoir, having a high ratio of energy stored to energy dissipated per half cycle (high "Q"). This energy storage feature facilitates great power delivery to the work without disturbing the stability of the system, and assures that if hard irregularities are encountered in the work, the momentary irregularities in drill pressure and displacement will be accommodated by the large reservoir of energy available in the massive elastic rod 81.

As already stated, the mud pump 58*a* is driven at a speed such as will achieve longitudinal resonance in the vibratory rod 81. This resonance region can be determined simply by finding the speed at which drilling proceeds most rapidly. However, this determination is considerably facilitated by use of an instrument for indicating at what operating region the vibrations are the greatest. Such an instrument (see Figure 2) may consist of a conventional electronic frequency and amplitude indicator I connected by suitable leads to a pick-up microphone M in contact with some vibrating part at the well head, for instance, the circulation head, or the goose-neck leading into the same. Notwithstanding the described precaution for preventing vibratory energy from being transmitted up the drill string, sufficient vibration energy will inevitably reach the well head to permit this determination.

Figures 14, 15 and 16 show, to some extent in diagrammatic form, a modified embodiment of drill in accordance with the invention, incorporating several further advantageous features of invention. Referring to Figure 14, the well bore is designated generally by the numeral 317, and the usual surface casing at 317*a*. A pipe 318 is suspended in the well bore, and this pipe is larger than ordinary drill pipe, preferably in the region of the small sizes of well casing. At the top of the pipe 318 is a swiveled circulation head 319, and the latter together with the pipe 318 may be suspended from the derrick in any usual manner, as for instance by use of any suitable suspending means engageable with the bails of the swivel 319. A usual rotary table, diagrammatically indicated at 320, is provided with conventional slips to engage the pipe 318. This table is employed for imparting slow rotation or rotary oscillation to the pipe 318 during drilling.

The drilling assembly proper is designated generally by numeral 321, and is suspended in pipe 318 by means of cable 322 which enters pipe 318 through a packing gland 319*a* at the top of circulation head 319. Drilling mud is supplied to pipe 317 through mud hose 323 connected to the circulation head.

The drilling assembly proper consists, as usual, of elastic vibration generator 324, elongated massive elastically vibratory rod 325, here shown as of a tapered type, with a downwardly increasing cross-sectional area, and bit 364 connected to the lower end of rod 325.

The vibration generator 324 is in this instance of a modified type employing an electric motor oriented on a vertical axis, and an interia member linearly reciprocated by said motor along a direction line longitudinally of the drilling string. Generator 324 has an external cylindrical case 327, which includes a top 328 screwed to the cylindrical side wall portion of the case by coupling joint 329. At the bottom, the case 327 has a bottom wall 330 formed with a coupling pin 331 screwed into the threaded box 332 at the upper end of the vibratory rod 325. Annularly spaced inside generator case 327 is a relatively massive inner housing 333, connected to case 327 by mounting webs 334. Screwed to the upper end of this housing member 333 is the cylindrical housing 335 of an electric drive motor 336, arranged with its axis of rotation concentric with the longitudinal axis of the drill string. This motor housing 335 is also annularly spaced inside casing 327, and may be fastened thereto by means of screws 337 engaging lugs 338 projecting from the motor housing. Sufficient annular space 339 is provided between the casing 321 and the assembly of motor case 335 with housing 333 to permit the passage of drilling mud fluid supplied to the upper end of the casing through intake ports 340, and this annular space 339 communicates below the lower end of housing 333 with a port 341 in the bottom end of casing 327 opening into the longitudinal mud fluid passage 342 in the vibratory rod 325. The top 328 of the generator casing 327 is equipped for passage of the supporting cable 322, and this supporting cable consists of a multi-strand steel wire line having an insulated electrical conductor 344 running concentrically therethrough. A packing gland 345 in the casing top 328 contains a metal fiber packing 346, which is compressed and expanded by means of packing nut 347 to secure the drilling assembly tightly to the cable 322, so that the entire drilling assembly is thus supported from the cable.

As here shown, the cable 322 extends inside the upper end of motor case 335, being sealed at its point of entry by means of rubber grommet 348, and the electric conductor 344 extends down to connect with the field winding of the stator member 349 of the motor 336. The armature 350 of the motor has its vertical shaft 351 supported in bearings 352 above and below the armature, and the lower end of the motor shaft carries, below lower bearing 352, a bevel gear 353. This bevel gear 353 meshes with a larger bevel gear 354 mounted on a transverse shaft 355 which is rotatably supported in housing 333 by means of antifriction bearings as indicated. A relatively heavy cylindrically shaped piston-like inertia weight or mass 356 is suspended within a cylindrical cavity 357 in the lower portion of housing 333 from an eccentric 358 on shaft 355 by means of a connecting rod 359. Connecting rod 359 is provided at its upper end with a strap containing an antifriction bearing 360, in which eccentric 358 freely rotates, and is pin jointed at 361 to the inertia weight or mass 356 so that the rotation of shaft 355 by motor 336 through reduction gears 353 and 354 will impart to the weight 356 a longitudinal reciprocation determined by the throw of eccentric 358. The alternating acceleration and deceleration of the reciprocating weight 356 results in cyclic reactive forces being transmitted through the eccentric drive and the shaft 355 to housing 333, and thence, via mounting webs 334, to the outside casing 327, to be transmitted by said casing and exerted upon the upper end of vibratory rod 325.

The linear, longitudinal reciprocation of the weight 356 thus results in the exertion of an alternating force on the upper end portion of the vibratory rod 325, as in the embodiment earlier described. The reduction gears 353 and 354 along with the reciprocating weight 356 and eccentric 358 furnish a velocity reduction and a force gaining mechanism between the moving power receiving member of the motor, i. e., its armature, and the point of connection of the generator casing to the vibratory rod 325. In order to have a sufficiently powerful electric drive motor, which is small enough to be capable of installation within the relatively limited space available for it, it must be of a high displacement type. That is to say, it must be of a type having a relatively high product of armature velocity and armature area. In practice, this requirement is fulfilled by a relatively small commercially available electric motor developing high speed, though relatively low torque. The high speed and low torque, however, are converted through the described velocity reducing and force gaining device into high cyclic force but small stroke amplitude at the power delivery connection with the vibratory rod.

The amplitude of reciprocation of the weight 356 may exceed that of the housing 333 and connected vibratory rod 325, but not necessarily so. The greater the weight of the piston 356, the less need be its stroke amplitude and velocity; and if the weight of the piston 356 is sufficient, the throw of the eccentric 358 may be made very small, so that the amplitude of motion of the piston 356 would be even less than that of the exterior casing 327. Theoretically, the stroke amplitude of the weight 356 may approach zero as its mass approaches infinity. A relatively small, high amplitude, fast traveling oscillating weight 356, while of great practical advantage, is therefore not an essential.

The vibratory rod 325 may be of the usual coupled drill collar type already described, although I have shown in Figures 14–16 a tapered type having certain advantages to be explained hereinafter. The small end of the tapered vibratory rod is coupled to the lower end of the vibration generator, and the large end thereof carries the bit, designated at 364. A large section of the tapered rod 325 has been broken away in the drawings, but it will be understood that this rod is again of substantial length, as for instance 120 feet, and that it may be made up of sections screwed together by suitable couplings. The taper may be uniform from end to end, or modified in various ways, as for instance by successive step-wise enlargements.

The annular space between the vibratory rod 325 and the pipe 318 is sealed by a packer 365 of relatively stiff material. This packer is mounted on the drilling assembly at a point below the mud fluid intake openings 340, typically at the top end of the vibratory rod 325, and preferably is of the cup type with its outer edge folded upwardly so that downward mud pressure presses its outer edge into sealing contact with the interior surface of pipe 318.

The expansive bit 364 comprises a pair of outwardly and downwardly inclined bit members 367 having cutting edges at their lower ends and whose upper ends are received in a downwardly opening cavity 368 at the lower end of vibratory rod 325, the upper end portions of the bit members being pivotally mounted on horizontal pins 369 mounted in the lower end of the rod 325. Compression springs 370 mounted between the upper ends of bit members 367 and seats formed inside cavity 368 tend to spread the lower ends of the bit members 367 apart until their upper ends come into engagement as shown in Figure 15. As the drilling assembly is lowered in the well hole, the two bit members are held together, against the compression of springs 370, by a wire 371 tied at its ends to pins 372 on the bit members 367. When the bottom of the well hole is reached, the bit then being below the lower end of the pipe 318, the drilling assembly is dropped a short distance to bring the bit members heavily into engagement with the bottom of the well hole. The resulting shock snaps wire 371 and permits springs 370 to force the bit members 367 apart until their upper ends engage one another, as shown.

Thus it is possible to lower the drilling assembly within the pipe 318 by cable 322 with the bit members contracted. Upon release of the bit members, the drilling operation may be begun and the bit members will generate a hole of substantially larger diameter than that of the pipe 318. When it is desired to remove the drill assembly, the pipe 318 can be left in the hole because the bit members 367 can slide upwardly inside said pipe. In drilling with the system of Figures 14–16, the motor 336 of the vibration generator will be driven by electrical current fed thereto via cable conductor 344, and the motor operates at a speed to drive the reciprocating inertia member 356 of the vibrator at a longitudinal resonant frequency of the vibratory rod 325. An alternating force of resonant frequency is thereby exerted on the vibratory rod 325, setting said rod into longitudinal standing wave action as described hereinabove, and the bit members 367 are thereby caused to vibrate against the hole bottom. During such action, the rotary table supporting the pipe 318 may be slowly driven, either rotated, or simply oscillated by rotary drive. The packer 365 tightly sealed between the vibratory rod 325 and the pipe 318 causes the rod 325 to turn with the pipe, so that the bit slowly rotates along with its vertical vibratory action. Alternatively, since in practice the bit tends to rotate slowly owing both to engagement with the formation and jet action at the mud discharge ports in the bit, a swivel can be introduced in the rod or bit, at any point below the packer, and the bit will then rotate without operation of the rotary table.

The bit member 364 (Figure 15) has blade portions 374 which are preferably substantially horizontal in the expanded position, and outside edges 375 which are preferably substantially vertical in the expanded position. The vertical edges 375 tend to exert lateral forces on the sides of the bore hole immediately adjacent the hole bottom, and this lateral pressure appears to set up stresses in the formation tending to favor elastic fatigue failure of the formation.

The discussion of the invention given immediately following the description of the embodiment of Figures 1 to 10, applies also to the embodiment of Figures 14–16. The embodiment of Figures 14–16, however, has several unique features, as follows: The tapered form of vibratory rod 325 (Figure 14) is of value for certain particularly hard formation, in that it results in a downward displacement of the velocity node and the lower velocity anti-node. The actual effect on the standing wave pattern is analogous to and can be in addition to that resulting from the employment of an initial downward biasing pressure on the drill. It has previously been described in connection with Figures 12*c* and 12*d* how a downward pressure on the drill will result in a downward displacement of the pressure anti-node, the condition at the lower end of the elastic rod becoming one of mixed velocity and pressure anti-node conditions. Actually, the lower end of the vibratory rod experiences both a substantial velocity cycle and a substantial stress cycle under these conditions, and the resulting increase in stress cycle of course means a desirable increase in bit pressure against the work.

The apparatus as shown in Figure 15 also has certain novel acoustic decoupling features. First, the cavity 368 in the lower end of the vibratory rod 325 forms an inverted cup or bell which collects a body of air or gas, so as to act as a surge chamber, and prevent effective "drive" of the drilling mud by the lower end of the vibratory rod 325 and the bit. The mud fluid will have a certain gas content, which will separate out at the turbulence pocket caused by the large increase in cross section where passage 601 opens into cavity 368. The cavity 368 contains this discharged gas. The gas body so trapped by this bell or surge chamber is readily compressible to accommodate cyclic surges of the mud fluid during vibratory operation of the drill, and cyclic surging of the mud fluid within this bell against the trapped air body will take the place of otherwise substantial transmission of sound waves up the column of mud fluid surrounding the drill string. The lower end of the vibratory rod and the bit are thus to a substantial extent acoustically decoupled from the surrounding mud fluid, and vibratory energy loss to the surrounding mud is very materially reduced. In addition, the annular space 376 between the elastic rod 325 and the pipe 318, below packer 365, forms an air or gas pocket, tending to collect a body of air or gas, and tending to isolate the entire length of the vibratory rod 325 from the mud fluid column outside. This feature accordingly also functions to provide an air body that is readily compressible to accommodate cyclic surges of the mud fluid during vibratory operation of the drill. In addition, prevention of the mud fluid from flowing up around the length of the vibratory rod 325 prevents vibratory drive of the mud fluid by the vibratory action of the lateral surfaces of the rod itself, and so aids very materially in acoustic decoupling. Both these features thus contribute to acoustic decoupling of the vibratory rod and bit from the drilling mud surrounding the drill string, tending, first, to keep the drilling fluid away from certain areas of vibratory parts, and second, providing surge chambers wherein collected air or gas bodies can cyclically compress sufficiently to accommodate cyclic displacement of the mud fluid and thereby prevent transmission of pressure surges up the mud column around the outside of the equipment.

The embodiment of Figures 14 to 16 may in some instances be employed without use of mud fluid circulation, in which event the pipe 318 and the rotary table 320 would be eliminated, and a non-expansive bit, such as shown in the embodiment of Figures 1 to 10, would then be substituted.

There have now been described two alternative elastic vibration generator devices, in one of which the vibrator component involves rotating inertia weight members, and in one of which the vibrator component involves a linearly reciprocating inertia weight member. It is not, however, necessary that the vibrator be of a type containing an inertia weight device, and in Figures 17 and 18 I have shown an alternative drilling apparatus of a type employing a vibration generator not employing such an inertia device. The apparatus shown in Figures 17 and 18 is again, illustratively, of the cable supported, electrically driven type, resembling in certain particulars the embodiment of Figures 14–16. The apparatus shown in Figures 17 and 18 is in a form suited for use either in a system like that shown in Figure 14, wherein mud fluid is circulated through the apparatus, or in a simple cable supported system without mud fluid circulation. In the first instance, an expansive type of bit would be employed, for example as shown in Figures 14 and 16, though in Figure 17 a non-expansive bit is illustrated, the assumption being made that mud fluid circulation using a pipe such as 318 is not to be employed.

Figures 17 and 18 show, at 380, the usual massive elongated elastically vibratory rod, which may again be typically composed of several coupled drill collars as earlier described, and which carries at its lower end a bit 380*a*. The upper end of this rod 380 has a threaded box 381 for reception of the threaded coupling pin 382 on the lower end of the exterior case 383 of elastic vibration generator 384. Case 383 contains, in annularly spaced relation therewithin, heavy inner housing 385, the housing being connected to the case as by mounting webs 386 coupled to the upper end of housing 385. Also in annularly spaced relation inside case 386 is electric drive motor 387, mounted on housing 385 with its axis of rotation concentric with the drill string. The motor 386 may be the same as that shown in Figure 16, having vertical drive shaft 387 extending downwardly from its lower end, and being mounted inside case 383 in the same way as described for the motor 336 in Figure 16. Case 383 has a top 388, which may be just like the corresponding member in Figure 16, and the apparatus is supported by flexible cable 389, understood to contain an electrical conductor supplying the motor 386, all as shown and described in connection with Figure 16.

The vertical drive shaft 387 of motor 386 carries bevel pinion 390 in mesh with larger bevel gear 391 on a transverse shaft 393 which is journalled in anti-friction bearings mounted in housing 385 as illustrated. Shaft 392 carries eccentric 393 around which is the strap 394 at the upper end of connecting rod 395, an anti-friction bearing being preferably employed between the strap and eccentric as illustrated. Housing 385 has a lower end wall 396 formed with a tubular boss containing a packing gland 397 surrounding coupling rod 398, so as to prevent mud fluid from working inside the housing 385. Rod 398 is pivotally connected at its upper end to the lower end of connecting rod 399, and is coupled at its lower end, as at 399, to a long tension rod 400, where it is securely clamped in any suitable manner, as for instance by employment of set screws 401.

In operation, each rotation of eccentric 393, driven through reduction gears 390 and 391 from the armature of motor 389, exerts a substantial force of tension in rods 398 and 400, and this tension results in a cyclic force of reaction in the bearings for the shaft 392. This bearing reaction is a vertically directed cyclic force acting on the upper end of the vibratory rod 380 through housing 385 and casing 383. At starting, when the upper end of the vibrating rod 380 has zero amplitude of oscillatory motion, the rod 400 must stretch to permit the eccentric to rotate. In full operation, the cyclic elongation of the rod 400 will be somewhat diminished, owing to the alternate elongation and contracting of the rod 380 which surrounds and acts in parallel with the rod 398 and 400, although with some difference in phase.

The rod 400 has been described as clamped to the vibratory rod 380 at the mid-section of the latter. This point of connection suggests itself for the reason that the mid-section of the rod is substantially stationary. However, it is only absolutely essential that the rod 400 be clamped sufficiently far down on the rod 380 so that it will have sufficient elastic stretch, in combination with the stretch of the rod 380, to allow the eccentric to rotate. Periodic forces of reaction will then be impressed on the bearings for the shaft 392, and will hence be exerted on the upper end of the vibratory rod 380.

The vibratory action of the vibratory rod 380 and the bit carried thereby is the same as in the earlier described embodiments and need not be repeated. If, as is assumed, the apparatus is to be employed without mud fluid circulation, it is simply suspended in the well bore by means of the flexible cable 389. The vibratory action of the bit on the bottom of the bore hole is usually sufficient to induce rotary oscillation. If fluid circulation is desired, it may be suspended inside a pipe, as in Figure 14, and an expansive type of bit substituted. Mud fluid will then enter the generator case through ports 388*a*, and will flow downwardly in the annular space around the motor and housing 385, and downwardly through coupling pin 382 into the longitudinal circulation passageway 402 in the vibratory rod 380, to be eventually discharged at the bit.

The bit 388 shown in Figure 17 includes an optional but advantageous feature in the provision of an inverted cup or bell 403 joined to the upper portion of the bit shank 404 and extending downwardly toward the bladed or winged formation-engaging portion 405 of the bit. This inverted cup or bell traps an air body inside it, so as to act as a surge chamber, and effectively prevent "drive" of surrounding well fluids by the vibrating bit. This feature is thus an acoustic decoupler of a type similar to that described in connection with Figure 15.

Figure 17*a* shows an alternative bit, having not only the inverted cup or bell, here designated by numeral 403*a*, but also a lost motion device by which the blade of the bit is maintained constantly in engagement with the hole bottom. The bit shank 403*b* will be understood as adapted to be coupled to the lower end of the vibratory rod above, here fragmentarily indicated by the numeral 380. The bit shank has a reduced end portion 406 telescopically received within a socket 407 formed at the top of the lower or formation engaging portion 405*a* of the bit, the latter being typically formed with blades or wings as desired. A compression spring 408 accommodated within a socket 409 extending upwardly into shank 403*b* and seating at its opposite ends in the bottoms of the sockets 407 and 409 tends to maintain the formation engaging member 405*a* in a position of downward extension relative to the shank portion 403*b*. Pins 410 extending laterally from the shank part 406 are received in vertically elongated slots 411 in the collar of the member 405*a* to limit the amount of relative telescopic movement between the bit shank 403*b* and the formation engaging portion 405*a* of the bit.

The lower formation engaging portion 405*a* of this bit is held constantly against the hole bottom under spring pressure. The shank of the bit directly connected on the lower end of the elongating and contracting elastic rod 380 cyclically impacts against the lower portion 405*a* by engagement of its annular shoulder 412 against the anvil afforded by the upper end of the collar portion of the bit part 405*a*. The work-engaging part 405*a* of the bit, being held in engagement with the formation by the spring 408, will vibrate with the formation without separating therefrom. This device thus assures continuous contact between the bit and the formation. The mud fluid is accordingly prevented from working in between the blades or wings of the bit and the formation at the hole bottom. When the mud fluid is permitted to come between the bit and the hole bottom, a certain loss of energy results because the bit must first displace the mud fluid and then strike the work. Movement of the mud fluid to and fro into and out of the space between the bit and the formation actually can represent a substantial energy loss, and this energy loss is reduced in the bit shown in Figure 17*a*.

Figures 19 and 19*a* show a simple, inexpensive form of elastic vibration generator, capable of use with any of the forms of vibratory resonant rod, adapted to be driven by the flow of mud fluid under pressure from the usual mud pump. Two unbalanced mud-driven rotor units 443 and 444 are coupled in series by means of threaded coupling 445. Rotor unit 443 has a cylindrical case 446, preferably comprised of two half-cylinders 446*a* and 446*b* welded along seam 447 as seen in Figure 19*a*. Casing 446 is provided with threaded coupling pins 448 at top and bottom for a connection to a fluid coupling 449 and the usual massive elongated vibratory rod 450, respectively. It will be understood that the vibratory rod 450 may be any of those described herein, and that it will carry a bit at its lower end. A heavy unbalanced rotor 451 is mounted transversely in case 446 on an axis which is displaced horizontally for a substantial distance from the vertical axis 452 of case 446. Rotor 451 is provided at its ends with stub shafts 453, which are journalled in roller bearings 454 set in case 446. Power receiving elements in the form of flexible paddles 455, preferably of some tough, stiff material, such as rubber and fabric belting, are fitted into groove 456 sunk in the peripheral surface of rotor 451. Each is held in place by means of a metal strap 457 which is drilled and countersunk to receive machine screws 458 which pass through the edge of the paddle 455 and are threaded into the rotor 451.

The interior of case 456 has a cylindrical rotor cavity 460 somewhat larger in diameter than rotor 451, and preferably having its axis through vertical axis 452. Rotor 451 is thus positioned with its axis parallel to that of cavity 460, but displaced toward the right hand wall thereof, as viewed in Figure 19, so that the mud fluid entering through upper case opening 461 passes to the left of the rotor 451, engaging paddles 455 and causing the rotor to rotate in a counterclockwise direction. The mud fluid passes out of case 456 through lower opening 462, through coupling 445 and to the upper opening 463 of lower rotor unit 444. Rotor 464 in unit 444 is positioned with its axis to the left of the axis of case 446 so that it rotates in a clockwise direction, i. e., opposite to that of rotor 451. Otherwise, the two rotor units 446 and 444 are identical, and further description of the latter will not be necessary. Both rotors 451 and 464 are hollow in one side, as indicated at 465, to provide unbalance so that their rotation imparts oscillating reactive forces through their bearings to the cases in which they are mounted. If the flow of mud fluid is adjusted so that the rate of rotation of the unbalanced rotor is very nearly that of a longitudinal resonant frequency of the elastically vibratory rod 450, then it will be found that the two rotors will automatically fall into a mode of rotation such that the centers of gravity of the two rotors will move up and down in step with one another, but will oscillate laterally always in opposition to one another. Lateral vibrations will hence be cancelled, but the vertical alternating bearing reactions of the two rotors will be additive, and will result in the exertion of an alternating force along the longitudinal direction line to the upper end of the vibratory rod 450. The rotors exhibit a natural tendency to fall into this manner of synchronized rotation when they are driven at a frequency which is near a longitudinal resonant frequency of the rod 450. Oscillatory motion of the upper end portion of rod 450, tending to augment itself as resonance is approached, is sufficient to react on each of the rotors in such a way as to cause it to move with its center of gravity oscillating in a definite phase relationship with the upper end portion of said rod. The two rotors thus are compelled to move in phased step with the vibratory rod, and hence in step with one another. Their longitudinal bearing reactions are accordingly additive, but since they turn in opposite directions, their lateral components of bearing reaction will cancel one another. Of course, the two fluid driven rotors might be geared together, as in the case of the generator illustrated in Figures 1 to 10. Figures 19 and 19*a*, however, show how a plurality of fluid driven unbalanced rotors will self-synchronize when coupled to the vibratory rod operating in the resonance range.

Attention is further directed to the fact that, in the embodiment of Figures 19 and 19*a*, the motor means and vibrator components of the elastic vibration generator assembly or combination are embodied in unitary structural devices, namely, the fluid driven unbalanced rotors 451 and 454. The power receiving members of the motor portions of these rotors are of course the fluid driven paddles, while the vibrator portions of the rotors consist of the unbalanced masses of the rotors. It is also to be appreciated that the generator of Figures 19 and 19*a* includes the necessary velocity reducing means between the power receiving member of the motor means and the elastic rod, in that the linear speed of travel of the mud stream and of the paddles driven thereby is substantially greater than the displacement stroke velocity of the point of coupling of the generator case to the elastic rod 450.

Figures 20 to 22 show another form of fluid driven elastic vibration generator device, capable of use with any of the forms of vibratory rod and bit, and designed to be driven by the drilling mud fluid. The generator in this instance comprises a housing or body 470, here shown as cylindrical, having at its upper and lower ends threaded pins 471 and 472 adapted for connection with a coupling box 473 on the end of a liquid supply conduit 474, and with a threaded box in the upper end of the vibratory rod 475, respectively. Inside of generator housing 470 a heavy mass element or piston 476 is slidably mounted between two heavy coil springs 477 and 478. Upper spring 477 seats at its upper end against an internal annular shoulder 479 in the body 470 and at its lower end on the upper face of piston 476. Lower spring 478 seats at its lower end on internal annular shoulder 480 formed in housing 470, and at its upper end against the lower face of piston 476. Piston 476 and springs 477 and 478 thus provide a mechanical oscillatory system susceptible to vertical oscillation at a natural resonant frequency about a centralized equilibrium position for the piston 476.

A presently described valve means is provided whereby the mud stream through the generator acts to reciprocate the piston, and in the present illustrative embodiment this valve means is incorporated in or carried by the piston, although this is not necessarily the case and valve means may be mounted independently of the piston. As here shown a vertical passage 481 through piston 476 is provided to permit the flow of mud fluid from the upper portion of generator housing 470 to the lower portion thereof. A cage 482 is attached to the lower face of piston 476, preferably by welding. Cage 482 consists of a pair of downwardly extending legs 483 which support at their lower ends a small plate 484, the upper surface of which provides a support for valve spring 485, and the center of which is provided with a hole 486. Valve spring 485 supports a spherical valve member 487, the upper face of which seats against a conical valve seat 488 at the lower end of piston passage 481. A vertically disposed cylindrical plunger 489 is connected to valve member 487 by means of a connecting bar 490 which is of sufficiently reduced cross-section to pass freely through the hole 486 in cage plate 484. The lower end of cylindrical plunger 489 is received into the flared opening 491 of a vertically positioned dash pot 492 which is supported at its lower end on a cage 493 attached to the upper end of tool-joint fitting 472. Preferably, dash pot 492 is provided with several small openings 494 near its lower end.

The manner in which the downward flow of fluid causes piston 481 to reciprocate within the generator case may be understood from a description of one cycle of operation, three steps of which are illustrated in Figures 20, 21 and 22.

Figure 20 shows piston 481 displaced from a position of rest to an extreme upward operating position with the piston passage 481 closed by valve body 487. In actual drilling operations the piston may be caused to be thrown into this position for starting purposes by bouncing the drill string, of which it is a part, against the bottom of the drill hole. Once having assumed the extreme upward position shown in Figure 20, piston 481 is urged downward by a spring 477, which in this position is highly compressed, and by pressure applied against the upper surface of piston 476 by the mud fluid flowing into drill case 470 through its upper end 471. Valve member 487 is initially prevented from opening and permitting the free passage of fluid through piston passage 481 because of its own inertial resistance to the downward acceleration and because of upward pressure applied by valve spring 478. The inertial effect of the weight of valve body 487 together with the attached connecting bar and plunger is enhanced by the dash pot 492 during the first half of the downstroke.

In Figure 21 the generator is shown just as the piston has completed a downward stroke and reached the low position. As the piston moves downwardly, it first accelerates to reach a maximum velocity at a mid-point between these two extreme positions and then decelerates as it approaches the extreme low point. This deceleration is caused by the compression of lower spring 478. This deceleration would ordinarily cause valve member 487 to leave conical opening 488 soon after the mid-point of the down stroke and permit the passage of fluid through piston 476, but this tendency is resisted by the action of plunger 489 in dash pot case 492. After a moment of hesitation at the extreme downward point, piston 476 will begin to move upward under the pressure of compressed spring 478. As this upward movement occurs, conical valve seat 488 moves away from valve member 487, releasing the pressure of fluid on the upper surface of piston 476, and thus permitting an increase in its upward acceleration.

Figure 22 shows piston 476 about midway in its path on its way up. Valve member 487 is seen to be lagging piston 476 so as to compress valve spring 485, and also to permit the free passage of fluid through the piston passage 481 into the lower portion of the generator case, from which it flows out at the bottom through fitting 472. After piston 476 passes the midpoint of its upward travel, as shown in Figure 22, however, it is steadily decelerated by the resistance to compression of upper spring 477. Valve member 487, which does not experience this decelerating force, has sufficient inertial and experiences sufficient upward acceleration from valve spring 485 to overcome the resistance of the downward pressure of fluid in passage 481 and the slowing effect of dash pot 492 so as to move into a closing position against conical seat 488 as piston 476 comes to a standstill at its extreme upward position as seen in Figure 20, thus completing a cycle.

The described vertical reciprocation of the piston 471 reacts on the generator housing and parts connected thereto to effect a vertical reciprocation of said parts, the amplitude of displacement of the latter being of course much less than that of the piston because of the much greater mass.

The frequency with which the generator is reciprocated is determined primarily by the mass of the piston and the stiffness of the springs, but it has been found that variation in fluid pressure also has some effect on frequency. As pressure goes up the amplitude of displacement increases and both frequency and fluid flow increase proportionately. As already mentioned, the amplitude of displacement of generator case 470 including all directly attached mass is substantially less than the amplitude of displacement of piston 476, the exact ratio depending upon the respective weights and being determined by the laws of momentum. This reactive relation is provided by the springs acting as an acoustic lever. When a spring is coupled between two unequal reciprocating masses, it automatically balances the kinetic forces so that the lesser mass moves through the greater amplitude.

This generator device will be seen to convert the relatively small force of the high velocity but small mass fluid-driven piston, travelling through a substantial displacement amplitude, into relatively great force exerted on the heavy generator housing and case and the connected elastic boring bar, where the displacement amplitude is relatively small, and it is hence a velocity reducing, force-gaining device which, with the aid of the resonant elastically vibratory rod which couples it to the bit, can deliver to the bit, and thence to the formation, cylic force impulses characterized by a high ratio of force to displacement amplitude. Attention is directed to the fact that, with the generator of Figures 20–22, the reciprocating piston 476 together with its appurtenances constitutes both the motor means and the vibrator of the vibration generator. Thus, the piston member 476 is a moving motor means, in the sense that it is fluid driven by the mud stream, and at the same time, this member 476 constitutes an inertia type of vibrator, which delivers alternating force impulses through the springs 477 and 478 to the external case of the device. I thus have embodied within the unitary structure of the piston 476 a moving motor means and an inertia mass vibrator driven thereby.

The vibration generator of Figures 20 to 22 will be seen to have a natural resonant frequency of its own, making it difficult to drive the piston 476 at any other frequency. It is accordingly desirable, in practice, to match the resonant frequency of this form of generator with the desired longitudinal resonant frequency of the elastic vibratory rod 475. Flow of the mud fluid through the generator will then always, no matter what the mud fluid pressure, drive the generator at the resonant frequency of the vibratory rod; an increasing mud fluid pressure will simply drive the generator at increasing amplitude. It will be seen that the resonant frequency for this generator may be made to correspond with either the fundamental resonant frequency of the vibratory rod (half wave operation), or an overtone. For example, assume that it is desired to drive the vibratory rod 475 at its first overtone, or in other words, to operate it as a full wave device, as diagrammed in Figure 12b. With other forms of generator, it is sometimes difficult to induce the elastic rod to "break" over from its half wave mode of operation to its full wave mode. However, by designing the generator of Figures 20 to 21 to have its own resonance frequency in the neighborhood of the desired overtone frequency of the vibratory rod, the difficulty vanishes at once, since the generator will only operate at the desired overtone frequency of the vibratory rod. The device of Figures 20–22 thus has particular advantage when it is desired to drive the vibratory rod at an overtone frequency.

Figure 23 shows a further form of the invention, in which the elongated vibratory rod, here designated by the numeral 530, is located above the vibration generator 531, the latter being coupled to the lower end of the rod 530, and the bit 532 being coupled to the lower end of the generator. The vibratory rod 530, generator 531, and bit 532 may be any of the types elsewhere disclosed herein, or any equivalent, and the details of these parts need not be given for the purpose of Figure 24. The upper end of the vibratory rod 530 is connected to the drill pipe string 535 above by a device 536 having two separate important functions, first, insulation of the vibratory drilling assembly below from the drill pipe string 535 above, whereby to prevent escape to vibratory energy up the drill string, and second, acoustic decoupling of the vibratory apparatus from the drilling mud in the bore hole surrounding the vibratory drilling apparatus. This device 536 comprises two sleeves 537 and 538, arranged end to end, but with a spacing distance therebetween. The upper end of upper sleeve 537 has a threaded box 539 for reception of the threaded pin on the lower end of drill pipe string 535. Lower sleeve 538 has at its lower end an adapter 541 for connection with the upper end of vibratory rod 530. A resilient sleeve 543, typically rubber, surrounds portion of both sleeves 537 and 538, as illustrated, and is in turn surrounded by a steel sleeve 544. The rubber sleeve 543 is vulcanized to the outside of the two sleeves 537 and 538, and also to the inside of the sleeve 544. The steel sleeve 544 is welded at the top to a flange on the upper end of sleeve 537. When the drill is in operation, and the vibratory rod 530 undergoing its vibratory action, the rubber inner connecting sleeve 543 functions as a shock and vibration absorbing and insulating means, isolating these vibrations from the drill string 535 above. In addition, the rubber sleeve 543 within the outside sleeve 544 forms a piston and sleeve assembly, having an important fluid-decoupling function. Cyclic pressure pulses in the surrounding mud fluid resulting from the vibratory action of the system ending at member 538 is prevented because the upper surface of member 538 moves within sleeve 544 much like a piston in a cylinder. The sleeve 544 thus is a sort of jacket which maintains room for the displacement of member 538 on each cycle, and pressure pulses in the mud fluid from this source are accordingly prevented, thus avoiding sending substantial energy consuming wave trains up the stream of drilling fluid towards the ground surface. The resilient sleeve 544 is also displaceable inwardly of its surrounding sleeve in response to external drill fluid cyclically displaced by the vibratory apparatus to accommodate or provide room for such displaced fluid, thereby reducing the transmission of sound wave trains in the drill fluid.

The relocation, in Figure 23 of the vibration generator to be between the vibratory rod 530 and the bit introduces no substantial operational difference, beyond the fact that the vibratory rod no longer has the function of intercoupling the vibration of tuning out the masses of reciprocating structure so as to permit delivery of maximum force at the point of engagement of the bit with the formation, and the further function of serving as a massive energy storing device contributing high "fly-wheel" effect to the vibratory system.

In Figures 24 and 25 is shown an embodiment of my invention in which the elongated vibratory rod is supported at its base, and in which the elastic vibration generator is intercoupled between the lower end of said rod and the bit. This embodiment has the further important feature that the vibratory rod is entirely enclosed within a surrounding casing, and so completely protected from contact with the surrounding mud fluid. This is of particular value as an acoustic decoupling feature, since contact of the drilling mud with the vibratory rod creates a condition of acoustic energy loss into the mud fluid.

The elastic rod is designated in Figure 24 by numeral 560, and it will be understood that this member is again a long elastic member having a longitudinal mode of elastic vibration at a resonant frequency. The lower end of the rod 560 is mounted in a socket 561 in the end of an adapter 562. The elastic vibration generator, designated generally by numeral 563, is threadedly connected at its upper end to the adapter 562, and at its lower end to bit 564, as indicated at 565. The vibration generator may be any of the types heretofore indicated, for instance, one of the mud fluid driven types, and provisions are shown in Figure 25 for fluid drive of the generator by the mud fluid.

The lower end of a drill pipe string 570 is coupled by means of adapter 571 to the upper end of a cylindrical housing 572. A second cylindrical housing or jacket 573 encloses the rod 560 and isolates it completely from the mud fluid. This housing or jacket 573 is shown as threaded onto the upper end of the adapter 562. The interior of casing or jacket 573 is long enough to provide sufficient clearance at the ends and around the vibratory rod 560 to permit of its maximum elastic deformation without contact with the top or sides of the member 573. The jacket 573 is annularly spaced inside the exterior housing 572 in order to provide for mud fluid circulation therebetween and is externally supported by an internal annular flange 575 in housing 572. This flange 575 is provided with circulation passages 576 for the mud fluid which enters the housing at its upper end from drill pipe string 570. The aforementioned adapter 562 has liquid inlet openings 577 communicating with the interior of vibration generator 563, and the liquid moving down inside the housing 572 accordingly enters these inlets and passes through the vibration generator to operate the motor means and vibrator within the same, being finally discharged from the bottom of the generator to exit by way of passage 578 in bit 564.

The vibratory rod 560 is shown in this instance to be made up of concentric steel sleeves 560a, and the friction between these sleeves damps bending action of the rod as a whole, and thereby combats undesirable lateral vibration. This action is further aided by the preferred employment of a viscous material, such as pitch, between the surfaces of the several concentric sleeves.

The embodiment of Figures 24 and 25 thus adds at least three noteworthy features, support of the elastic rod 560 at its base, complete isolation of the vibratory rod from the surrounding mud fluid, and the concentric sleeve arrangement designed to reduce tendencies toward lateral vibration.

Figures 26 to 28 show an alternative embodiment employing rotation of the drill string as a motive power means. A fragmentary upper portion of the vibratory elastic rod is shown at 620, and it will be understood that the fragment shown will preferably be at or near a velocity anti-node region of the rod, the rod extending, for example, a substantial distance downwardly from the fragment shown to its point of connection with a suitable bit. As shown in Figure 27, the elastic rod 620 includes an upper section 620a and a lower section 620b, joined by a pin and box coupling 621. The upper section 620a may be regarded as a short sub, provided at the top with a threaded box 622 to receive the threaded pin on the lower end of drill pipe string 623. In effect, however, it functions as the upper end portion of the elastic rod 620.

A massive sleeve 625 fits slidably over the rod 620, as here shown, overlapping a portion of the member 620a, and has a series of longitudinally extended teeth 626 projecting from its outer surface. The upper and lower ends 627 and 628 of sleeve 625 are shaped in the form of matching sine wave cam surfaces, and these cam surfaces are engaged by rollers 629 mounted through bearings 630 on studs 631 set into the rod. In operation, the teeth 626 may engage the wall of the drill hole as the drill moves down, and by their engagement with the wall, or by drag thereupon by the drilling mud surrounding the apparatus, the sleeve 625 is prevented or held back from rotating as the drill string and rod 620 are rotated. Accordingly, rotation of the rod 620 while rotation of sleeve 625 is prevented or reduced, causes the sleeve member 625 riding on rollers 629 to move up and down on rod 620.

The resulting acceleration and deceleration of the massive sleeve 625 transmits alternating reactive forces to the rod 620 through the rollers 629. These bearing reactions become a large alternating force acting longitudinally on the vibrator rod 620. By having a relatively large cam stroke, or great massiveness in sleeve 625, it is possible to generate a large cyclic driving force with a sleeve 625 of relatively small mass.

It will be evident that the elastic vibration generator shown in Figures 26 to 28 has the essentials previously outlined, namely, a mechanical vibrator (sleeve 625) for applying cyclic longitudinal vibration forces on the rod, a motor means having a power receiving member (rollers 629) operating the vibrator and a velocity reducing means (the cam formations) between the power receiving member of the motor means and the vibratory rod so that the power receiving member travels (around the cam) at greater linear velocity than the elastic deformation stroke velocity of the driving connection of the vibrator to the rod. It will be understood that the drill string will be rotated at the proper speed to reciprocate the sleeve 625 at the resonant frequency of the rod 630 so as to achieve resonant performance as described elsewhere herein.

In most of the forms of my drill, the elastic vibration generator is rigidly connected to the vibratory elastic rod. It is not essential, however, that the generator be rigidly coupled to the vibratory elastic rod, and in fact, in some cases there is advantage in providing a flexible or elastic coupling between the elastic vibration generator and the vibratory rod. In Figure 29, for example, the elastic vibratory rod is designated at 660, its bit at 661, and the vibration generator at 662, the housing of the latter having its fixed driving connection to the upper end of the rod 660 in the form of a relatively slender elastic rod 663. For the purpose of Figure 29, the generator may be assumed to include a self-contained generator driving motor, provisions for operating this motor being omitted from the figure in the interests of simplicity. Directly connected to the upper end of the housing of generator 662 is a second elastic vibratory rod 665, comparable in length and material to the main elastic rod 660. The entire system may be supported as desired; for instance, the upper end of rod 665 may be supported by a pipe string 666 of reduced diameter.

In the operation of the system of Figure 29, the vibration generator 662, when driven at the longitudinal resonant frequency of the rod 660, will transmit an alternating force to the upper end of the rod 660 via the elastic rod 663. This alternating force exerted against the upper end of the rod 660 will set it into its characteristic standing wave operation, providing, typically, a velocity anti-node V at the upper end, a velocity anti-node V at the lower end, and a velocity node V' at the mid-section. The behavior of the rod 660 is analogous to the elastic vibratory rods previously described. The vibratory rod 665 is also driven by the alternating force developed by generator 662, and is also set into longitudinal standing wave action, with velocity anti-nodes V at the ends, and a velocity node V' at the mid-section. If now, owing to particularly hard going, or at the start of operation, the engagement of the bit 661 with the work should tend to cause the lower vibratory rod 660 to stall, this will merely result in temporary lost motion action within the slender elastic connecting rod 663, which will elongate and contract to permit the vibration generator 662 a substantial amplitude of oscillatory motion owing to its being coupled to the lower end of the auxiliary elastic vibrator rod 665. Thus operation of the vibration generator 662 drives the auxiliary rod 665 at maximum vibration amplitude in the characteristic longitudinal standing wave action, and this proceeds to some degree undisturbed by any condition encountered by the bit. The alternating force is at all times transmitted through rod 663 to the main elastic vibratory rod 660, however, and the latter is enabled to assume at all times the maximum standing wave action permitted by the work. If its vibration amplitude should at any time be diminished, this is simply taken up within the slender relatively flexible rod 663. This is of particular advantage with some types of vibration generators, for example, that of Figure 19 and 19*a* where no mechanical synchronized means is employed between the unbalanced rotors. In such a case, preservation of proper synchronism between the rotors depends upon a fairly substantial vibration of the vibration generator housing along with the elastic vibratory rod. This is afforded in the system of Figure 29, in that the upper or auxiliary rod 665 cannot be stalled under any conditions.

The invention has now been illustrated and described by reference to a number of specific illustrative embodiments, some of which have been shown in full mechanical detail, and some, for simplicity, only in diagrammatic form. These have been given to illustrate the broad range of application of the invention. They of course do not exhaust the range of possibilities of the invention, but are sufficient to present some of the diverse forms in which the inventive concept may be successfully and practically employed. Many changes in design, structure, and arrangement may of course be made without departing from the spirit and scope of the appended claims.

I claim:

1. Apparatus for drilling a bore hole in the earth, having in combination: an elongated massive elastic drill rod of fixed length; an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod; and a bit drivingly coupled to the end of said rod to transmit forces from said rod to the earth formation below; said assembly also embodying a motor means having a power receiving member drivingly connected to operate said vibrator, and a velocity reducing means connected between said power receiving member and said rod so that said power receiving member travels at a greater linear velocity than the elastic deformation stroke velocity of said driving connection of said vibrator to said rod, said power receiving member receiving motive power transmitted down said bore hole for actuation from the earth's surface, said motor means and vibrator being of smaller lateral dimensions than the bore hole formed by the bit and being mounted in a fixed position relative to said rod to accompany said rod down said bore hole.

2. The subject matter of claim 1, including also a pipe string connected at its lower end to said apparatus for supporting said apparatus in said bore hole from the ground surface, and wherein the drill rod is of materially greater cross-sectional area than said pipe string.

3. The subject matter of claim 1, including also a drill string for suspending said apparatus in said bore hole from the ground surface, and a yieldable coupling means between said apparatus and said string for insulating the vibrations of said rod from the drill string.

4. The subject matter of claim 1, wherein said generator assembly is mounted at the upper end of said drill rod.

5. The subject matter of claim 1, wherein said drill rod has an increase in mass per unit of length in a direction toward the bit.

6. The subject matter of claim 1, wherein said vibrator embodies an eccentrically weighted rotor means including oppositely rotating rotors mounted for rotation on axes transverse of the drill rod, so as to generate an alternating force along a direction line longitudinal of said rod.

7. The subject matter of claim 1, wherein said vibrator comprises a member connected to the drill rod and reciprocable longitudinally of the drill rod, so as to generate an alternating force along a direction line longitudinal of said rod.

8. The subject matter of claim 1, wherein said vibrator comprises an inertia weight member linearly reciprocable longitudinally of the drill rod, so as to generate an alternating force along a direction line longitudinal of said rod.

9. The subject matter of claim 1, wherein said power receiving member of said motor means is mounted to rotate relative to the drill rod.

10. The subject matter of claim 1, wherein said drill rod is a drill collar having a drill fluid passage extending therethrough, and wherein said motor means has a drill fluid passage therethrough communicating with said passage of said drill collar, said power receiving member being interposed in the fluid passage of said motor means and being fluid driven by the flow of drill fluid through said passages.

11. The subject matter of claim 1, wherein said motor means is located above said vibrator with a substantial spacing distance therebetween, transmission means including a long shaft drivingly interconnecting said power receiving member of said motor means with said vibrator, and flexible vibration insulating means interconnecting said motor means and said vibrator.

12. The subject matter of claim 11, wherein said motor means and vibrator are spaced apart by a distance of the order of a quarter wave length of a longitudinal wave generated in said rod by said resonant frequency alternating force.

13. Apparatus for drilling a bore hole in the earth, having in combination: an elongated massive elastic drill rod of fixed length; an elastic vibration generator assembly embodying a mechanical vibrator having a fixed driving connection to said rod, said vibrator being operable to apply cyclic longitudinal vibration forces on said rod at a vibration frequency between the limits of S/4L and S/2L, where L is the length of the drill rod and S is the speed of sound in the material of the drill rod, or at whole multiples of said limiting values; and a bit drivingly coupled to the end of said rod to transmit forces from said rod to the earth formation below; said generator assembly also embodying a motor means having a power receiving member drivingly connected to operate said vibrator, said power receiving member travelling at a greater linear velocity than the elastic deformation stroke velocity of said driving connection of said vibrator to said rod, said power receiving member receiving motive power transmitted down said bore hole for actuation from the earth's surface, said motor means and vibrator being of smaller lateral dimensions than the bore hole formed by the bit and being mounted in a fixed position relative to said rod to accompany said rod down said bore hole.

14. For use with earth boring apparatus including motive power means at the ground surface and a drill string to be lowered in the bore hole, an earth boring tool assembly having means for connection to the lower end of said drill string and comprising an elongated massive elastic drill collar of fixed length, an elastic vibration generator assembly embodying a high speed motor and a speed reducing means, the speed reducing means being interconnected between the motor and the drill collar, said speed reducing means including a mechanical vibrator fixedly connected to said drill collar, said vibrator being operable to apply longitudinal vibration forces to said drill collar at the frequency of a longitudinal resonant elastic vibration of said drill collar, said motor having a high speed rotor mounted for rotation on the longitudinal axis of the drill string and drivingly connected to operate said vibrator, said rotor being actuated by the motive power means from the earth's surface, and a bit drivingly coupled to the end of said drill collar to transmit forces from said drill collar to the earth formation below, said generator assembly being of smaller lateral dimensions than the bore hole formed by the bit to accompany said drill collar down the bore hole.

15. Apparatus for drilling a bore hole in earthen formations having in combination: a bit for applying drilling action on the bottom of said bore hole, an elongated massive rod drivingly coupled to said bit, an elastic vibration generator combination attached to said rod, said combination embodying a vibrator means having a fixed driving connection to said rod, said vibrator being operable to apply cyclic longitudinal vibration forces on said rod at the frequency of a longitudinal resonant elastic vibration of said rod, said generator combination also embodying a power receiving means having an impedance characteristic lower than that of the formation, said power receiving means being drivingly connected to operate said vibrator and adapted to receive and be actuated by motive power transmitted down said bore hole from the earth's surface, said generator combination being of smaller lateral dimensions than the bore hole formed by the bit and being mounted in a fixed position relative to said rod to accompany said rod down said bore hole.

16. An apparatus according to claim 15 in which the generator combination embodies a hydraulic power receiving means drivingly connected to operate said vibrator, said power receiving means being adapted to receive and be actuated by hydraulic motive power having the impedance of a drill fluid stream which is transmitted down said bore hole from the earth's surface.

ALBERT G. BODINE, JR.

(References on following page)

REFERENCES CITED

The following references are of record in the file of this patent:

UNITED STATES PATENTS

| Number | Name | Date |
|---|---|---|
| 699,273 | Wolski | May 6, 1902 |
| 701,391 | Pruszkowski | June 3, 1902 |
| 1,526,748 | Herman | Feb. 17, 1925 |
| 1,600,492 | Schmidt | Sept. 21, 1926 |
| 1,607,082 | Howcott | Nov. 16, 1926 |
| 1,646,959 | Fisher | Oct. 25, 1927 |
| 1,697,570 | Mecom | Jan. 1, 1929 |
| 1,870,540 | Wells | Aug. 9, 1932 |
| 1,966,446 | Hayes | July 17, 1934 |
| 2,002,385 | Bannister | May 21, 1935 |
| 2,091,680 | Greenlee | Aug. 31, 1937 |
| 2,103,137 | Basgan | Dec. 21, 1937 |
| 2,166,937 | Bettis | July 25, 1939 |
| 2,170,057 | Kerr | Aug. 22, 1939 |
| 2,229,912 | Baily | Jan. 28, 1941 |
| 2,250,912 | Hudson et al. | July 29, 1941 |
| 2,287,157 | Wolff | June 23, 1942 |
| 2,294,125 | Niedermeier | Aug. 25, 1942 |
| 2,344,725 | Phipps | Mar. 21, 1944 |
| 2,350,212 | Bodine | May 30, 1944 |
| 2,388,741 | Hays | Nov. 13, 1945 |
| 2,390,646 | Hays | Dec. 11, 1945 |
| 2,425,012 | Snyder | Aug. 5, 1947 |
| 2,505,854 | Curzon | May 2, 1950 |
| 2,507,230 | Stinnett | May 9, 1950 |

FOREIGN PATENTS

| Number | Country | Date |
|---|---|---|
| 66,420 | Norway | Nov. 20, 1940 |
| 515,807 | Great Britain | Dec. 14, 1939 |